United States Patent
Song et al.

(10) Patent No.: US 10,487,647 B2
(45) Date of Patent: Nov. 26, 2019

(54) HYBRID DOWNHOLE ACOUSTIC WIRELESS NETWORK

(71) Applicants: Limin Song, West Windsor, NJ (US); Yibing Zhang, Annandale, NJ (US); Scott William Clawson, Califon, NJ (US); Katie M. Walker, Milford, NJ (US)

(72) Inventors: Limin Song, West Windsor, NJ (US); Yibing Zhang, Annandale, NJ (US); Scott William Clawson, Califon, NJ (US); Katie M. Walker, Milford, NJ (US)

(73) Assignee: ExxonMobil Upstream Research Company, Spring, TX (US)

(*) Notice: Subject to any disclaimer, the term of this patent is extended or adjusted under 35 U.S.C. 154(b) by 0 days.

(21) Appl. No.: 15/666,299

(22) Filed: Aug. 1, 2017

(65) Prior Publication Data

US 2018/0058208 A1    Mar. 1, 2018

Related U.S. Application Data

(60) Provisional application No. 62/428,374, filed on Nov. 30, 2016, provisional application No. 62/381,330, (Continued)

(51) Int. Cl.
*E21B 47/16*    (2006.01)
*H04B 11/00*    (2006.01)
(Continued)

(52) U.S. Cl.
CPC .......... *E21B 47/16* (2013.01); *E21B 41/0085* (2013.01); *E21B 47/0005* (2013.01);
(Continued)

(58) Field of Classification Search
CPC ...... E21B 47/16; E21B 47/18; E21B 47/0006; E21B 41/0085; E21B 47/0005; E21B 47/011
See application file for complete search history.

(56) References Cited

U.S. PATENT DOCUMENTS

| | | | |
|---|---|---|---|
| 3,103,643 A | 9/1963 | Kalbfel | 340/17 |
| 3,205,477 A | 9/1965 | Kalbfell | 340/18 |

(Continued)

FOREIGN PATENT DOCUMENTS

| | | | |
|---|---|---|---|
| CN | 102733799 | 6/2014 | E21B 47/16 |
| EP | 0636763 | 2/1995 | E21B 47/12 |

(Continued)

OTHER PUBLICATIONS

U.S. Appl. No. 15/666,334, filed Aug. 1, 2017, Walker, Katie M. et al.

(Continued)

*Primary Examiner* — Ryan W Sherwin
(74) *Attorney, Agent, or Firm* — ExxonMobil Upstream Research Company—Law Department

(57) ABSTRACT

A hybrid electro-acoustic system for extending battery life of a downhole wireless telemetry system. The system includes a plurality of battery-powered intermediate communications nodes spaced along a downhole tubular body and attached to a wall of the tubular body, each of the battery-powered intermediate communications nodes configured to alternate between a sleep mode and an active mode and comprising: a power source comprising one or more batteries positioned within a housing; an electro-acoustic transducer and a transceiver, or a separate transmitter and receiver, positioned within the housing; and a topside communications node comprising: a transmitter and a power supply, the topside communications node structured and arranged to send an acoustic signal to one or more of the (Continued)

battery-powered intermediate communications nodes to place same in the active mode; wherein the power supply of the topside communications node is sufficient to enable communications directly with the intermediate communications node most remote from the surface and greater than the battery power provided to each of the intermediate communications nodes.

26 Claims, 8 Drawing Sheets

Related U.S. Application Data filed on Aug. 30, 2016, provisional application No. 62/381,335, filed on Aug. 30, 2016, provisional application No. 62/428,367, filed on Nov. 30, 2016, provisional application No. 62/428,385, filed on Nov. 30, 2016, provisional application No. 62/433,491, filed on Dec. 13, 2016, provisional application No. 62/428,425, filed on Nov. 30, 2016.

(51) Int. Cl.
  *E21B 41/00* (2006.01)
  *E21B 47/00* (2012.01)
  *E21B 47/18* (2012.01)
  *E21B 47/01* (2012.01)

(52) U.S. Cl.
  CPC .......... *E21B 47/0006* (2013.01); *E21B 47/18* (2013.01); *H04B 11/00* (2013.01); *E21B 47/011* (2013.01)

(56) References Cited

U.S. PATENT DOCUMENTS

| | | | |
|---|---|---|---|
| 3,512,407 A | 5/1970 | Zill | 73/152 |
| 3,637,010 A | 1/1972 | Malay et al. | 166/51 |
| 3,741,301 A | 6/1973 | Malay et al. | 166/191 |
| 3,781,783 A | 12/1973 | Tucker | 340/18 |
| 3,790,930 A | 2/1974 | Lamel et al. | 340/18 |
| 3,900,827 A | 8/1975 | Lamel et al. | 340/18 |
| 3,906,434 A | 9/1975 | Lamel et al. | 340/18 |
| 4,001,773 A | 1/1977 | Lamel et al. | 340/18 |
| 4,283,780 A | 8/1981 | Nardi | 367/82 |
| 4,298,970 A | 11/1981 | Shawhan et al. | 367/82 |
| 4,302,826 A | 11/1981 | Kent et al. | 367/82 |
| 4,314,365 A | 2/1982 | Petersen et al. | 367/82 |
| 4,884,071 A | 11/1989 | Howard | 340/854 |
| 4,962,489 A | 10/1990 | Medlin et al. | 367/32 |
| 5,128,901 A | 7/1992 | Drumheller | 367/82 |
| 5,136,613 A | 8/1992 | Dumestre, III | 375/1 |
| 5,166,908 A | 11/1992 | Montgomery | 367/165 |
| 5,182,946 A * | 2/1993 | Boughner | E21B 47/00 702/6 |
| 5,234,055 A | 8/1993 | Cornette | 166/278 |
| 5,283,768 A | 2/1994 | Rorden | 367/83 |
| 5,373,481 A | 12/1994 | Orban et al. | 367/82 |
| 5,468,025 A | 11/1995 | Adinolfe et al. | 285/114 |
| 5,480,201 A | 1/1996 | Mercer | 294/67.31 |
| 5,495,230 A | 2/1996 | Lian | 340/551 |
| 5,562,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,850,369 A | 12/1998 | Rorden et al. | 367/83 |
| 5,857,146 A | 1/1999 | Kido | 455/38.3 |
| 5,924,499 A | 7/1999 | Birchak et al. | 175/40 |
| 5,960,883 A | 10/1999 | Tubel et al. | 166/313 |
| 5,995,449 A | 11/1999 | Green et al. | 367/83 |
| 6,049,508 A | 4/2000 | Deflandre | 367/48 |
| 6,125,080 A | 9/2000 | Sonnenschein et al. | 367/134 |
| 6,128,250 A | 10/2000 | Reid et al. | 367/153 |
| 6,177,882 B1 | 1/2001 | Ringgenberg et al. | 340/853.7 |
| 6,236,850 B1 | 5/2001 | Desai | 455/343 |
| 6,239,690 B1 | 5/2001 | Burbidge et al. | 340/10.33 |
| 6,300,743 B1 | 10/2001 | Patino et al. | 320/106 |
| 6,320,820 B1 | 11/2001 | Gardner et al. | 367/81 |
| 6,324,904 B1 | 12/2001 | Ishikawa et al. | 73/152.03 |
| 6,360,769 B1 | 3/2002 | Brisco | 137/268 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,880 B1 | 12/2003 | Hall et al. | 336/132 |
| 6,679,332 B2 | 1/2004 | Vinegar et al. | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 | 8/2005 | Tang et al. | 340/854.4 |
| 6,940,392 B2 | 9/2005 | Chan et al. | 340/10.4 |
| 6,940,420 B2 | 9/2005 | Jenkins | 340/855.6 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,252,152 B2 | 8/2007 | LoGiudice et al. | 166/386 |
| 7,257,050 B2 | 8/2007 | Stewart et al. | 367/82 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.8 |
| RE40,032 E | 1/2008 | Van Borkhorst Hendrik et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,893 B2 | 3/2008 | Huang et al. | 340/854.3 |
| 7,385,523 B2 | 6/2008 | Thomeer et al. | 340/854.8 |
| 7,387,165 B2 | 6/2008 | Lopez de Cardenas et al. | 166/313 |
| 7,411,517 B2 | 8/2008 | Flanagan | 340/854.4 |
| 7,477,160 B2 | 1/2009 | Lemenager et al. | 340/853.1 |
| 7,516,792 B2 | 4/2009 | Lonnes et al. | 166/308.1 |
| 7,551,057 B2 | 6/2009 | King et al. | 340/5.72 |
| 7,590,029 B2 | 9/2009 | Tingley | 367/82 |
| 7,595,737 B2 | 9/2009 | Fink et al. | 340/854.4 |
| 7,602,668 B2 | 10/2009 | Liang et al. | 367/25 |
| 7,649,473 B2 | 1/2010 | Johnson et al. | 340/853.1 |
| 7,750,808 B2 | 7/2010 | Masino et al. | 340/572.1 |
| 7,775,279 B2 | 8/2010 | Marya et al. | 166/297 |
| 7,787,327 B2 | 8/2010 | Tang et al. | 367/27 |
| 7,819,188 B2 | 10/2010 | Auzerais et al. | 155/250 |
| 7,828,079 B2 | 11/2010 | Oothoudt | 175/20 |
| 7,831,283 B2 | 11/2010 | Ogushi et al. | 455/574 |
| 7,913,773 B2 | 3/2011 | Li et al. | 175/40 |
| 7,952,487 B2 | 5/2011 | Montebovi | 340/636.1 |
| 7,994,932 B2 | 8/2011 | Huang et al. | 340/854.3 |

(56) References Cited

U.S. PATENT DOCUMENTS

| | | | |
|---|---|---|---|
| 8,004,421 B2 | 8/2011 | Clark | 340/854.4 |
| 8,044,821 B2 | 10/2011 | Mehta | 340/855.7 |
| 8,049,506 B2 | 11/2011 | Lazarev | 324/333 |
| 8,115,651 B2 | 2/2012 | Camwell et al. | 340/853.2 |
| 8,117,907 B2 | 2/2012 | Han et al. | 73/152.58 |
| 8,157,008 B2 | 4/2012 | Lilley | 166/253.1 |
| 8,162,050 B2 | 4/2012 | Roddy et al. | 166/253.1 |
| 8,220,542 B2 | 7/2012 | Whitsitt et al. | 166/278 |
| 8,237,585 B2 | 8/2012 | Zimmerman | 340/854.6 |
| 8,242,928 B2 | 8/2012 | Prammer | 340/853.7 |
| 8,276,674 B2 | 10/2012 | Lopez De Cardenas et al. | 166/373 |
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy et al. | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp et al. | 109/25 |
| 8,544,564 B2 | 10/2013 | Moore et al. | 175/50 |
| 8,552,597 B2 | 10/2013 | Song et al. | 307/149 |
| 8,556,302 B2 | 10/2013 | Dole | 285/367 |
| 8,559,272 B2 | 10/2013 | Wang | |
| 8,596,359 B2 | 12/2013 | Grigsby et al. | 166/278 |
| 8,605,548 B2 | 12/2013 | Froelich | 367/82 |
| 8,607,864 B2 | 12/2013 | Mcleod et al. | 166/250.1 |
| 8,664,958 B2 | 3/2014 | Simon | 324/338 |
| 8,672,875 B2 | 3/2014 | Vanderveen et al. | 604/67 |
| 8,675,779 B2 | 3/2014 | Zeppetelle et al. | 375/340 |
| 8,683,859 B2 | 4/2014 | Godager | 73/152.54 |
| 8,689,621 B2 | 4/2014 | Godager | 73/152.54 |
| 8,701,480 B2 | 4/2014 | Eriksen | 73/152.51 |
| 8,750,789 B2 | 6/2014 | Baldemair et al. | 455/11.1 |
| 8,787,840 B2 | 7/2014 | Srinivasan et al. | 455/69 |
| 8,805,632 B2 | 8/2014 | Coman et al. | 702/89 |
| 8,826,980 B2 | 9/2014 | Neer | 166/255.1 |
| 8,833,469 B2 | 9/2014 | Purkis | 166/373 |
| 8,893,784 B2 | 11/2014 | Abad | E21B 43/26 |
| 8,910,716 B2 | 12/2014 | Newton et al. | 166/373 |
| 8,994,550 B2 | 3/2015 | Millot et al. | E21B 47/16 |
| 8,995,837 B2 | 3/2015 | Mizuguchi et al. | H04B 10/27 |
| 9,062,508 B2 | 6/2015 | Huval et al. | E21B 47/122 |
| 9,062,531 B2 | 6/2015 | Jones | E21B 47/082 |
| 9,075,155 B2 | 7/2015 | Luscombe et al. | G01V 1/226 |
| 9,078,055 B2 | 7/2015 | Nguyen et al. | H04R 5/00 |
| 9,091,153 B2 | 7/2015 | Yang et al. | E21B 47/12 |
| 9,133,705 B2 | 9/2015 | Angeles Boza | E21B 47/12 |
| 9,140,097 B2 | 9/2015 | Themig et al. | E21B 34/12 |
| 9,144,894 B2 | 9/2015 | Barnett et al. | B25B 17/00 |
| 9,206,645 B2 | 12/2015 | HallundbaeK | E21B 7/04 |
| 9,279,301 B2 | 3/2016 | Lovorn et al. | E21B 21/103 |
| 9,284,819 B2 | 3/2016 | Tolman et al. | E21B 41/00 |
| 9,284,834 B2 | 3/2016 | Alteirac et al. | E21B 47/12 |
| 9,310,510 B2 | 4/2016 | Godager | G01V 3/38 |
| 9,333,350 B2 | 5/2016 | Rise et al. | A61N 1/36082 |
| 9,334,696 B2 | 5/2016 | Hay | E21B 47/12 |
| 9,359,841 B2 | 6/2016 | Hall | E21B 23/00 |
| 9,363,605 B2 | 6/2016 | Goodman et al. | H04R 17/00 |
| 9,376,908 B2 | 6/2016 | Ludwig et al. | E21B 47/01 |
| 9,441,470 B2 | 9/2016 | Guerrero et al. | E21B 43/14 |
| 9,515,748 B2 | 12/2016 | Jeong et al. | G10L 25/90 |
| 9,557,434 B2 | 1/2017 | Keller et al. | G01V 1/52 |
| 9,617,829 B2 | 4/2017 | Dale et al. | E21B 41/00 |
| 9,617,850 B2 | 4/2017 | Fripp et al. | E21B 47/18 |
| 9,631,485 B2 | 4/2017 | Keller et al. | E21B 47/16 |
| 9,657,564 B2 | 5/2017 | Stolpman | E21B 47/16 |
| 9,664,037 B2 | 5/2017 | Logan et al. | E21B 47/122 |
| 9,670,773 B2 | 6/2017 | Croux | E21B 47/16 |
| 9,683,434 B2 | 6/2017 | Machocki | E21B 44/00 |
| 9,686,021 B2 | 6/2017 | Merino | E21B 47/16 |
| 9,715,031 B2 | 7/2017 | Contant et al. | E21B 47/122 |
| 9,721,448 B2 | 8/2017 | Wu et al. | G08B 21/20 |
| 9,759,062 B2 | 9/2017 | Deffenbaugh et al. | E21B 47/16 |
| 9,816,373 B2 | 11/2017 | Howell et al. | E21B 47/16 |
| 9,822,634 B2 | 11/2017 | Gao | E21B 47/16 |
| 9,863,222 B2 | 1/2018 | Morrow et al. | E21B 43/122 |
| 9,879,525 B2 | 1/2018 | Morrow et al. | E21B 47/12 |
| 9,945,204 B2 | 4/2018 | Ross et al. | E21B 33/127 |
| 9,963,955 B2 | 5/2018 | Tolman et al. | E21B 43/119 |
| 10,100,635 B2 | 10/2018 | Keller et al. | E21B 47/18 |
| 10,103,846 B2 | 10/2018 | van Zelm et al. | E21B 47/12 |
| 10,132,149 B2 | 11/2018 | Morrow et al. | E21B 43/267 |
| 10,145,228 B2 | 12/2018 | Yarus et al. | E21B 44/00 |
| 10,167,716 B2 | 1/2019 | Clawson et al. | E21B 47/14 |
| 10,167,717 B2 | 1/2019 | Deffenbaugh et al. | E21B 47/16 |
| 10,190,410 B2 | 1/2019 | Clawson et al. | E21B 47/14 |
| 10,196,862 B2 | 2/2019 | Li-Leger et al. | E21B 17/02 |
| 2002/0180613 A1 | 12/2002 | Shi et al. | E21B 47/18 |
| 2003/0056953 A1 | 3/2003 | Tumlin et al. | 166/298 |
| 2003/0117896 A1 | 6/2003 | Sakuma et al. | 367/81 |
| 2004/0020063 A1 | 2/2004 | Lewis et al. | 33/313 |
| 2004/0200613 A1 | 10/2004 | Fripp et al. | 166/250.01 |
| 2004/0239521 A1 | 12/2004 | Zierolf | 340/854.1 |
| 2005/0269083 A1 | 12/2005 | Burris, II et al. | 166/255.2 |
| 2005/0284659 A1 | 12/2005 | Hall et al. | 175/27 |
| 2006/0033638 A1 | 2/2006 | Hall et al. | 340/854.6 |
| 2006/0041795 A1 | 2/2006 | Gabelmann et al. | 714/699 |
| 2006/0090893 A1 | 5/2006 | Sheffield | 166/250.15 |
| 2007/0139217 A1 | 6/2007 | Beique et al. | 340/856.3 |
| 2007/0146351 A1 | 6/2007 | Katsurahira et al. | 345/179 |
| 2007/0156359 A1 | 7/2007 | Varsamis et al. | 702/69 |
| 2007/0219758 A1 | 9/2007 | Bloomfield | 702/190 |
| 2007/0272411 A1 | 11/2007 | Lopez de Cardenas et al. | 166/305.1 |
| 2008/0030365 A1 | 2/2008 | Fripp et al. | E21B 47/16 |
| 2008/0110644 A1 | 5/2008 | Howell et al. | 166/387 |
| 2008/0185144 A1 | 8/2008 | Lovell | 166/250.17 |
| 2008/0304360 A1 | 12/2008 | Mozer | 367/117 |
| 2009/0003133 A1 | 1/2009 | Dalton et al. | 367/82 |
| 2009/0030614 A1 | 1/2009 | Carnegie et al. | 702/6 |
| 2009/0034368 A1 | 2/2009 | Johnson | 367/83 |
| 2009/0045974 A1 | 2/2009 | Patel | 340/854.6 |
| 2009/0080291 A1 | 3/2009 | Tubel et al. | 367/81 |
| 2009/0166031 A1 | 7/2009 | Hernandez | 166/250.01 |
| 2010/0013663 A1 | 1/2010 | Cavender et al. | 340/854.3 |
| 2010/0089141 A1 | 4/2010 | Rioufol et al. | 73/152.28 |
| 2010/0133004 A1 | 6/2010 | Burleson et al. | 175/2 |
| 2010/0182161 A1 | 7/2010 | Robbins et al. | 340/853.7 |
| 2010/0212891 A1 | 8/2010 | Stewart et al. | 166/250.12 |
| 2011/0061862 A1 | 3/2011 | Loretz et al. | 166/250.11 |
| 2011/0066378 A1 | 3/2011 | Lerche et al. | 702/6 |
| 2011/0168403 A1 | 7/2011 | Patel | 166/373 |
| 2011/0176387 A1 | 7/2011 | Froelich | 367/82 |
| 2011/0188345 A1 | 8/2011 | Wang | 367/34 |
| 2011/0297376 A1 | 12/2011 | Holderman et al. | 166/278 |
| 2011/0297673 A1 | 12/2011 | Zbat et al. | 219/756 |
| 2011/0301439 A1 | 12/2011 | Albert et al. | 600/301 |
| 2011/0315377 A1 | 12/2011 | Rioufol | 166/250.17 |
| 2012/0043079 A1 | 2/2012 | Wassouf et al. | 166/250 |
| 2012/0126992 A1 | 5/2012 | Rodney et al. | 340/850 |
| 2012/0152562 A1 | 6/2012 | Newton et al. | 166/369 |
| 2012/0179377 A1 | 7/2012 | Lie | 702/6 |
| 2013/0000981 A1 | 1/2013 | Grimmer et al. | 175/45 |
| 2013/0003503 A1 | 1/2013 | L'Her et al. | 367/106 |
| 2013/0106615 A1 | 5/2013 | Prammer | 340/854.6 |
| 2013/0138254 A1 | 5/2013 | Seals et al. | 700/282 |
| 2013/0192823 A1 | 8/2013 | Barrilleaux et al. | 166/250.01 |
| 2013/0248172 A1 | 9/2013 | Angeles Boza et al. | |
| 2013/0278432 A1 | 10/2013 | Shashoua et al. | 340/853.7 |
| 2013/0319102 A1 | 12/2013 | Ringgenberg et al. | 73/152.28 |
| 2014/0060840 A1 | 3/2014 | Hartshorne et al. | 166/300 |
| 2014/0062715 A1 | 3/2014 | Clark | 340/853.2 |
| 2014/0102708 A1 | 4/2014 | Purkis et al. | 166/308.1 |
| 2014/0133276 A1 | 5/2014 | Volker et al. | 367/82 |
| 2014/0152659 A1 | 6/2014 | Davidson et al. | 345/420 |

(56) References Cited

U.S. PATENT DOCUMENTS

| | | | |
|---|---|---|---|
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0266769 A1 | 9/2014 | van Zelm | 340/854.3 |
| 2014/0327552 A1* | 11/2014 | Filas | E21B 47/122 340/854.6 |
| 2014/0352955 A1 | 12/2014 | Tubel et al. | 166/250.15 |
| 2014/0352981 A1* | 12/2014 | Fripp | E21B 41/0085 166/381 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0152727 A1 | 6/2015 | Fripp et al. | E21B 47/14 |
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0292319 A1 | 10/2015 | Disko et al. | E21B 47/16 |
| 2015/0292320 A1 | 10/2015 | Lynk et al. | E21B 47/16 |
| 2015/0300159 A1 | 10/2015 | Stiles et al. | E21B 47/16 |
| 2015/0330200 A1 | 11/2015 | Richard et al. | E21B 44/00 |
| 2015/0337642 A1 | 11/2015 | Spacek | E21B 44/005 |
| 2015/0354351 A1 | 12/2015 | Morrow et al. | E21B 47/16 |
| 2015/0377016 A1 | 12/2015 | Ahmad | E21B 47/122 |
| 2016/0010446 A1 | 1/2016 | Logan et al. | E21B 47/122 |
| 2016/0047230 A1 | 2/2016 | Livescu et al. | E21B 47/10 |
| 2016/0047233 A1 | 2/2016 | Butner et al. | E21B 47/12 |
| 2016/0076363 A1 | 3/2016 | Morrow et al. | E21B 47/12 |
| 2016/0109606 A1 | 4/2016 | Market et al. | G01V 1/50 |
| 2016/0215612 A1 | 7/2016 | Morrow | E21B 47/122 |
| 2016/0237759 A1 | 8/2016 | Li-Leger et al. | 166/380 |
| 2017/0138185 A1 | 5/2017 | Saed et al. | E21B 47/16 |
| 2017/0145811 A1* | 5/2017 | Robison | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/035 |
| 2018/0066510 A1 | 3/2018 | Walker et al. | E21B 47/011 |

FOREIGN PATENT DOCUMENTS

| | | | |
|---|---|---|---|
| EP | 1409839 | 4/2005 | E21B 43/1185 |
| EP | 2677698 | 12/2013 | H04L 12/28 |
| WO | WO2002/027139 | 4/2002 | E21B 43/12 |
| WO | WO2010/074766 | 7/2010 | A41C 1/14 |
| WO | WO2013/079928 | 6/2013 | E21B 47/12 |
| WO | WO 2013/079928 A2 | 6/2013 | |
| WO | WO 2013/112273 A2 | 8/2013 | |
| WO | WO2014/018010 | 1/2014 | E21B 47/12 |
| WO | WO 2014/018010 A1 | 1/2014 | |
| WO | WO2014/049360 | 4/2014 | E21B 47/12 |
| WO | WO 2014/049360 A2 | 4/2014 | |
| WO | WO2014/100271 | 6/2014 | E21B 47/12 |
| WO | WO2014/134741 | 9/2014 | E21B 47/13 |
| WO | WO 2014/134741 A1 | 9/2014 | |
| WO | WO2015/117060 | 8/2015 | E21B 47/12 |

OTHER PUBLICATIONS

U.S. Appl. No. 16/139,373, filed Sep. 24, 2018, Yi, Xiaohua et al.

U.S. Appl. No. 16/139,384, filed Oct. 13, 2017, Disko, Mark M. et al.

U.S. Appl. No. 16/139,394, filed Oct. 13, 2017, Song, Limin et al.

U.S. Appl. No. 16/139,403, filed Oct. 13, 2017, Song, Limin et al.

U.S. Appl. No. 16/139,414, filed Oct. 13, 2017, Zhang, Yibing et al.

U.S. Appl. No. 16/139,421, filed Oct. 13, 2017, Song, Limin et al.

U.S. Appl. No. 16/139,427, filed Oct. 13, 2017, Disko, Mark M. et al.

U.S. Appl. No. 16/175,418, filed Oct. 30, 2018, Kent, David K. et al.

U.S. Appl. No. 62/588,067, filed Nov. 17, 2017, Song, Limin et al.

U.S. Appl. No. 62/588,080, filed Nov. 17, 2017, Kinn, Timothy F. et al.

U.S. Appl. No. 62/588,103, filed Nov. 17, 2017, Yi, Xiaohua et al.

Arroyo, Javier et al. (2009) "Forecasting Histogram Time Series with K-Nearest Neighbours Methods," *International Journal of Forecasting*, v.25, pp. 192-207.

Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.

Arroyo, Javier et al. (2011) "Forecasting with Interval and Histogram Data Some Financial Applications," *Univ. of California, Dept. of Economics*, 46 pages.

Emerson Process Management (2011), "Roxar downhole Wireless PT sensor system," www.roxar.com, or downhole@roxar.com, 2 pgs.

Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.

Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.

Qu, X. et al. (2011) "Reconstruction fo Self-Sparse 20 NMR Spectra From undersampled Data in The Indirect Dimension", pp. 8888-8909.

U.S. Department of Defense (1999) "Interoperability and Performance Standards for Medium and High Frequency Radio Systems," *MIL-STD-188-141B*, Mar. 1, 1999, 584 pages.

\* cited by examiner

HYBRID DOWNHOLE ACOUSTIC WIRELESS NETWORK

CROSS REFERENCE TO RELATED APPLICATION

This application claims the benefit of U.S. Provisional Application Ser. No. 62/428,374, filed Nov. 30, 2016, entitled "Hybrid Downhole Acoustic Wireless Network," U.S. Provisional Application Ser. No. 62/381,330, filed Aug. 30, 2016, entitled "Communication Networks, Relay Nodes for Communication Networks, and Methods of Transmitting Data Among a Plurality of Relay Nodes," U.S. Provisional Application Ser. No. 62/381,335, filed Aug. 30, 2016 entitled "Zonal Isolation Devices Including Sensing and Wireless Telemetry and Methods of Utilizing the Same," U.S. Provisional Application Ser. No. 62/428,367, filed Nov. 30, 2016, entitled "Dual Transducer Communications Node for Downhole Acoustic Wireless Networks and Method Employing Same," U.S. Provisional Application Ser. No. 62/428,385, filed Nov. 30, 2016 entitled "Methods of Acoustically Communicating And Wells That Utilize The Methods," U.S. Provisional Application Ser. No. 62/433,491, filed Dec. 13, 2016 entitled "Methods of Acoustically Communicating And Wells That Utilize The Methods," and U.S. Provisional Application Ser. No. 62/428,425 filed Nov. 30, 2016, entitled "Acoustic Housing for Tubulars," the disclosures of which are incorporated herein by reference in their entireties.

FIELD

The present disclosure relates generally to the field of data transmission along a tubular body, such as a steel pipe. More specifically, the present disclosure relates to the transmission of data along a pipe within a wellbore or along a pipeline, either at the surface or in a body of water. The present disclosure further relates to systems and methods for extending the battery life of data transmission data transmission equipment.

BACKGROUND

In the oil and gas industry, it is desirable to obtain data from a wellbore. Several real time data systems have been proposed. One involves the use of a physical cable such as an electrical conductor or a fiber optic cable that is secured to the tubular body. The cable may be secured to either the inner or the outer diameter of the pipe. The cable provides a hard wire connection that allows for real-time transmission of data and the immediate evaluation of subsurface conditions. Further, these cables allow for high data transmission rates and the delivery of electrical power directly to downhole sensors.

It has been proposed to place a physical cable along the outside of a casing string during well completion. However, this can be difficult as the placement of wires along a pipe string requires that thousands of feet of cable be carefully unspooled and fed during pipe connection and run-in. Further, the use of hard wires in a well completion requires the installation of a specially-designed well head that includes through-openings for the wires.

Various wireless technologies have been proposed or developed for downhole communications. Such technologies are referred to in the industry as telemetry. Several examples exist where the installation of wires may be either technically difficult or economically impractical. The use of radio transmission may also be impractical or unavailable in cases where radio-activated blasting is occurring, or where the attenuation of radio waves near the tubular body is significant.

The use of acoustic telemetry has also been suggested. Acoustic telemetry employs an acoustic signal generated at or near the bottom hole assembly or bottom of a pipe string. The signal is transmitted through the wellbore pipe, meaning that the pipe becomes the carrier medium for sound waves. Transmitted sound waves are detected by a receiver and converted to electrical signals for analysis.

Faster data transmission rates with some level of clarity have been accomplished using electromagnetic (EM) telemetry. EM telemetry employs electromagnetic waves, or alternating current magnetic fields, to jump across pipe joints. In practice, a specially-milled drill pipe may be provided that has a conductor wire machined along an inner diameter. The conductor wire transmits signals to an induction coil at the end of the pipe. The induction coil, in turn, transmits an EM signal to another induction coil, which sends that signal through the conductor wire in the next pipe. Thus, each threaded connection provides a pair of specially milled pipe ends for EM communication.

While high data transmission rates can be accomplished using RF signals in a downhole environment, the transmission range is typically limited to a few meters. This, in turn, requires the use of numerous repeaters.

A downhole network is often powered by batteries that can be energy-limited because of the constraints of space and cost. To extend the useful life of the network requires saving battery power. However, there is lack of methods to wake the nodes up when the data acquisition is required. As a result, the life of the network is limited to months, not years.

Accordingly, a need exists for a high speed wireless transmission system for use in a wellbore that offers extended battery life.

SUMMARY

In one aspect, provided is a hybrid electro-acoustic system for extending battery life of a downhole wireless telemetry system. The system includes a plurality of battery-powered intermediate communications nodes spaced along a downhole tubular body and attached to a wall of the tubular body, each of the battery-powered intermediate communications nodes configured to alternate between a sleep mode and an active mode and comprising: a power source comprising one or more batteries positioned within a housing; an electro-acoustic transducer and a transceiver, or a separate transmitter and receiver, positioned within the housing; and a topside communications node comprising: a transmitter and a power supply, the topside communications node structured and arranged to send an acoustic signal to one or more of the battery-powered intermediate communications nodes to place same in the active mode; wherein the power supply of the topside communications node is sufficient to enable communications directly with the intermediate communications node most remote from the surface and greater than the battery power provided to each of the intermediate communications nodes.

In some embodiments, the system further comprises one or more battery-powered sensing nodes located at sensing locations along a downhole tubular body and attached on a wall of the tubular body, at least one sensing device in the sensing node, each of the battery-powered sensing nodes configured to alternate between a sleep mode and an active mode and comprising: a power source comprising one or more batteries positioned within a housing; an electro-acoustic transducer and a transceiver, or a separate transmitter and receiver, positioned within the housing, wherein the power supply of the topside communications node is sufficient to enable communications directly with the sensing node most remote from the surface and greater than the battery power provided to each of the sensing nodes.

In some embodiments, the sleep mode is a deep-sleep mode.

In some embodiments, the topside communications node communicates with the plurality of battery-powered intermediate communications nodes and one or more sensing nodes by generating a sound or a vibration that propagates downhole via a wall of the tubular body or a fluid within the tubular body.

In some embodiments, the topside communications node further includes a repetitive impactor, a pneumatic vibrator, an eccentric motor, a piezoelectric stack, or an oscillating valve to generate the sound or vibration that propagates downhole to communicate with the plurality of battery-powered intermediate communications nodes and one or more sensing nodes.

In some embodiments, the plurality of battery-powered intermediate communications nodes and/or one or more sensing nodes further comprise a vibration resonator and electrical switch to receive the sound or vibration from the topside communications node and initiate a resonant vibration of the vibration resonator at a pre-selected frequency and place one or more of the battery-powered intermediate communications nodes and/or one or more sensing nodes in the active mode.

In some embodiments, the resonator includes a cantilever vibrator or a ball-spring vibrator with a resonance frequency matching that of the sound or a vibration source.

In some embodiments, the tubular body has one or more passbands associated therewith and the pre-selected frequency or frequencies are the frequencies within the passbands of the downhole tubular body so that the acoustic wave propagation loss is minimal.

In some embodiments, the topside communications node further includes a modulator for modulating the sound or vibration generated therefrom.

In some embodiments, the modulator produces a pattern of "on" and "off" signals to transmit a surface command to a specific battery-powered intermediate communications node.

In some embodiments, the plurality of battery-powered intermediate communications nodes and/or one or more sensing nodes further comprises energy harvesting electronics. In some embodiments, the energy harvesting electronics includes a super-capacitor or chargeable batteries.

In some embodiments, the resonator functions as a power receiver to convert sound and vibration energy transmitted from the topside communications node into electrical power via the energy harvesting electronics.

In some embodiments, the plurality of battery-powered intermediate communications nodes further comprise passband filtering circuitry to isolate a pre-selected frequency range of the acoustic signal.

In another aspect, provided is a method of extending battery life of a downhole wireless telemetry system. The method includes providing a plurality of battery-powered intermediate communications nodes spaced along a downhole tubular body and attached to a wall of the tubular body, each of the battery-powered intermediate communications nodes configured to alternate between a sleep mode and an active mode and comprising: a power source comprising one or more batteries positioned within a housing; an electro-acoustic transducer and a transceiver, or a separate transmitter and receiver, positioned within the housing; providing a topside communications node comprising: a transmitter and a power supply; sending an acoustic signal from the topside communications node to one or more of the battery-powered intermediate communications nodes; and placing one or more of the battery-powered intermediate communications nodes in the active mode.

In some embodiments, the sleep mode is a deep-sleep mode.

In some embodiments, the power supply of the topside communications node is sufficient to enable communications directly with the intermediate communications node most remote from the surface and greater than the battery power provided to each of the intermediate communications nodes.

In some embodiments, the method further includes communicating with the plurality of battery-powered intermediate communications nodes by generating a sound or a vibration that propagates downhole via a wall of the tubular body or a fluid within the tubular body.

In some embodiments, the topside communications node further comprises a repetitive impactor, a pneumatic vibrator, an eccentric motor, a piezoelectric stack, or an oscillating valve to generate the sound or vibration that propagates downhole to communicate with the plurality of battery-powered intermediate communications nodes.

In some embodiments, the plurality of battery-powered intermediate communications nodes includes a vibration resonator.

In some embodiments, the method further includes initiating a resonant vibration in response to the sound or vibration from the topside communications node at a pre-selected frequency and placing one or more of the battery-powered intermediate communications nodes in the active mode by completing an electrical circuit.

In some embodiments, the method further includes converting sound and vibration energy from the topside communications node into electrical power via energy harvesting electronics.

In yet another aspect, provided is a method of assessing changes in subterranean well integrity along the length of the subterranean well. The method includes providing a plurality of battery-powered intermediate communications nodes spaced along a downhole tubular body and attached to a wall of the tubular body, each of the battery-powered intermediate communications nodes configured to alternate between a sleep mode and an active mode and comprising: a power source comprising one or more batteries positioned within a housing; an electro-acoustic transducer and a transceiver, or a separate transmitter and receiver, positioned within the housing; providing a topside communications node comprising: a transmitter and a power supply; sending an acoustic signal from the topside communications node to one or more of the battery-powered intermediate communications nodes; and determining the acoustic response of the one or more battery-powered intermediate communications nodes to assess the condition of a propagation path between the topside communications node and each of the one or more battery-powered intermediate communications nodes.

In some embodiments, the method further includes constructing a linear acoustic tomography by measuring acoustic parameters between the topside communications node and each of the one or more battery-powered intermediate communications nodes.

In some embodiments, the method is repeated at a different time, and the change in acoustic parameters measured to determine whether a physical change in well conditions has occurred.

In some embodiments, the physical change in well conditions includes a change in fluid in the tubular body, a change in cement condition over time, or a change in tubular body integrity over time.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation. The forms disclosed herein are illustrated by way of example, and not by way of limitation, in the figures of the accompanying drawings and in which like reference numerals refer to similar elements and in which:

DETAILED DESCRIPTION

Terminology

Figure 1:
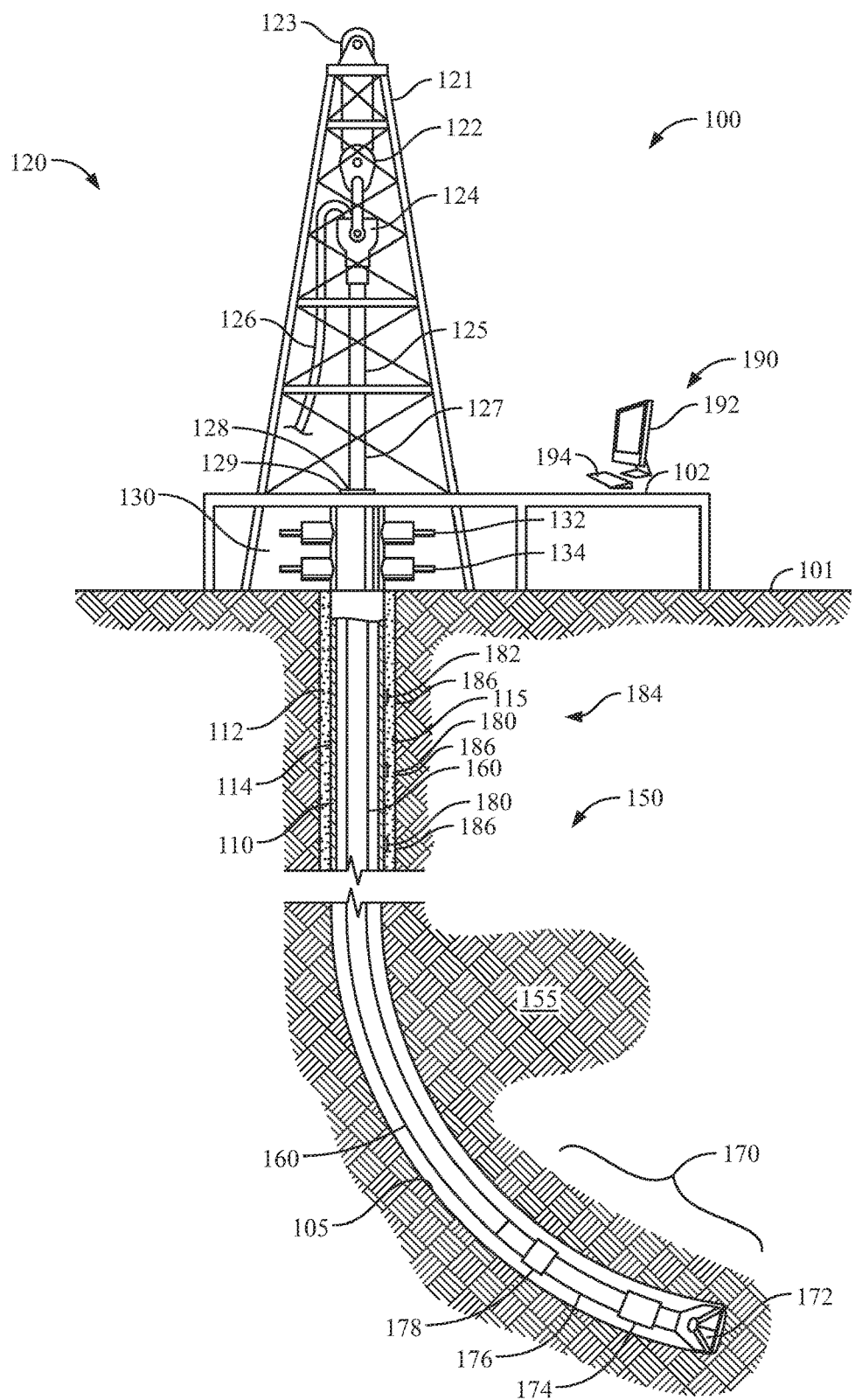
FIG. 1 presents a side, cross-sectional view of an illustrative, nonexclusive example of a wellbore. The wellbore is being formed using a derrick, a drill string and a bottom hole assembly. A series of communications nodes is placed along the drill string as part of a telemetry system, according to the present disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

About: As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Above/below: In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

Any: The adjective "any" means one, some, or all indiscriminately of whatever quantity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Comprising: In the claims, as well as in the specification, all transitional phrases such as "comprising," "including," "carrying," "having," "containing," "involving," "holding," "composed of," and the like are to be understood as open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Couple: Any use of any form of the terms "connect", "engage", "couple", "attach", or any other term describing an interaction between elements is not meant to limit the interaction to direct interaction between the elements and may also include indirect interaction between the elements described.

Determining: "Determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Embodiments: Reference throughout the specification to "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

Exemplary: "Exemplary" is used exclusively herein to mean "serving as an example, instance, or illustration." Any embodiment described herein as "exemplary" is not necessarily to be construed as preferred or advantageous over other embodiments.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an exemplary method. In some examples, blocks may be combined, may be separated into multiple components, may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time. In some examples, methods may be implemented as processor executable instructions. Thus, a machine-readable medium may store processor executable instructions that if executed by a machine (e.g., processor) cause the machine to perform a method.

Full-physics: As used herein, the term "full-physics," "full physics computational simulation," or "full physics simulation" refers to a mathematical algorithm based on first principles that impact the pertinent response of the simulated system.

May: Note that the word "may" is used throughout this application in a permissive sense (i.e., having the potential to, being able to), not a mandatory sense (i.e., must).

Operatively connected and/or coupled: Operatively connected and/or coupled means directly or indirectly connected for transmitting or conducting information, force, energy, or matter.

Optimizing: The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

Order of steps: It should also be understood that, unless clearly indicated to the contrary, in any methods claimed herein that include more than one step or act, the order of the steps or acts of the method is not necessarily limited to the order in which the steps or acts of the method are recited.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, the term "formation" refers to any definable subsurface region. The formation may contain one or more hydrocarbon-containing layers, one or more non-hydrocarbon containing layers, an overburden, and/or an underburden of any geologic formation.

As used herein, the term "hydrocarbon" refers to an organic compound that includes primarily, if not exclusively, the elements hydrogen and carbon. Examples of hydrocarbons include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° C. and 1 atm pressure). Hydrocarbon fluids may include, for example, oil, natural gas, gas condensates, coal bed methane, shale oil, shale gas, and other hydrocarbons that are in a gaseous or liquid state.

As used herein, the term "potting" refers to the encapsulation of electrical components with epoxy, elastomeric, silicone, or asphaltic or similar compounds for the purpose of excluding moisture or vapors. Potted components may or may not be hermetically sealed.

As used herein, the term "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, the term "sensor" includes any electrical sensing device or gauge. The sensor may be capable of monitoring or detecting pressure, temperature, fluid flow, vibration, resistivity, or other formation data. Alternatively, the sensor may be a position sensor.

As used herein, the term "subsurface" refers to geologic strata occurring below the earth's surface.

The terms "tubular member" or "tubular body" refer to any pipe, such as a joint of casing, a portion of a liner, a drill string, a production tubing, an injection tubing, a pup joint, a buried pipeline, underwater piping, or above-ground piping. solid lines therein, and any suitable number of such structures and/or features may be omitted from a given embodiment without departing from the scope of the present disclosure.

As used herein, the term "wellbore" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

The terms "zone" or "zone of interest" refer to a portion of a subsurface formation containing hydrocarbons. The term "hydrocarbon-bearing formation" may alternatively be used.

Description

Specific forms will now be described further by way of example. While the following examples demonstrate certain forms of the subject matter disclosed herein, they are not to be interpreted as limiting the scope thereof, but rather as contributing to a complete description.

FIG. 1 is a side, cross-sectional view of an illustrative well site 100. The well site 100 includes a derrick 120 at an earth surface 101. The well site 100 also includes a wellbore 150 extending from the earth surface 101 and down into an earth subsurface 155. The wellbore 150 is being formed using the derrick 120, a drill string 160 below the derrick 120, and a bottom hole assembly 170 at a lower end of the drill string 160.

Referring first to the derrick 120, the derrick 120 includes a frame structure 121 that extends up from the earth surface 101. The derrick 120 supports drilling equipment including a traveling block 122, a crown block 123 and a swivel 124. A so-called kelly 125 is attached to the swivel 124. The kelly 125 has a longitudinally extending bore (not shown) in fluid communication with a kelly hose 126. The kelly hose 126, also known as a mud hose, is a flexible, steel-reinforced, high-pressure hose that delivers drilling fluid through the bore of the kelly 125 and down into the drill string 160.

The kelly 125 includes a drive section 127. The drive section 127 is non-circular in cross-section and conforms to an opening 128 longitudinally extending through a kelly drive bushing 129. The kelly drive bushing 129 is part of a rotary table. The rotary table is a mechanically driven device that provides clockwise (as viewed from above) rotational force to the kelly 125 and connected drill string 160 to facilitate the process of drilling a borehole 105. Both linear and rotational movement may thus be imparted from the kelly 125 to the drill string 160.

A platform 102 is provided for the derrick 120. The platform 102 extends above the earth surface 101. The platform 102 generally supports rig hands along with various components of drilling equipment such as pumps, motors, gauges, a dope bucket, tongs, pipe lifting equipment and control equipment. The platform 102 also supports the rotary table.

It is understood that the platform 102 shown in FIG. 1 is somewhat schematic. It is also understood that the platform 102 is merely illustrative and that many designs for drilling rigs and platforms, both for onshore and for offshore operations, exist. These include, for example, top drive drilling systems. The claims provided herein are not limited by the configuration and features of the drilling rig unless expressly stated in the claims.

Placed below the platform 102 and the kelly drive section 127 but above the earth surface 101 is a blow-out preventer, or BOP 130. The BOP 130 is a large, specialized valve or set of valves used to control pressures during the drilling of oil and gas wells. Specifically, blowout preventers control the fluctuating pressures emanating from subterranean formations during a drilling process. The BOP 130 may include upper 132 and lower 134 rams used to isolate flow on the back side of the drill string 160. Blowout preventers 130 also prevent the pipe joints making up the drill string 160 and the drilling fluid from being blown out of the wellbore 150 in the event of a sudden pressure kick.

As shown in FIG. 1, the wellbore 150 is being formed down into the subsurface formation 155. In addition, the wellbore 150 is being shown as a deviated wellbore. Of course, this is merely illustrative as the wellbore 150 may be a vertical well or even a horizontal well, as shown later in FIG. 2.

In drilling the wellbore 150, a first string of casing 110 is placed down from the surface 101. This is known as surface casing 110 or, in some instances (particularly offshore), conductor pipe. The surface casing 110 is secured within the formation 155 by a cement sheath 112. The cement sheath 112 resides within an annular region 115 between the surface casing 110 and the surrounding formation 155.

During the process of drilling and completing the wellbore 150, additional strings of casing (not shown) will be provided. These may include intermediate casing strings and a final production casing string. For an intermediate case string or the final production casing, a liner may be employed, that is, a string of casing that is not tied back to the surface 101.

As noted, the wellbore 150 is formed by using a bottom hole assembly 170. The bottom-hole assembly 170 allows the operator to control or "steer" the direction or orientation of the wellbore 150 as it is formed. In this instance, the bottom hole assembly 170 is known as a rotary steerable drilling system, or RSS.

The bottom hole assembly 170 will include a drill bit 172. The drill bit 172 may be turned by rotating the drill string 160 from the platform 102. Alternatively, the drill bit 172 may be turned by using so-called mud motors 174. The mud motors 174 are mechanically coupled to and turn the nearby drill bit 172. The mud motors 174 are used with stabilizers or bent subs 176 to impart an angular deviation to the drill bit 172. This, in turn, deviates the well from its previous path in the desired azimuth and inclination.

There are several advantages to directional drilling. These primarily include the ability to complete a wellbore along a substantially horizontal axis of a subsurface formation, thereby exposing a greater formation face. These also include the ability to penetrate into subsurface formations that are not located directly below the wellhead. This is particularly beneficial where an oil reservoir is located under an urban area or under a large body of water. Another benefit of directional drilling is the ability to group multiple wellheads on a single platform, such as for offshore drilling. Finally, directional drilling enables multiple laterals and/or sidetracks to be drilled from a single wellbore in order to maximize reservoir exposure and recovery of hydrocarbons.

The illustrative well site 100 also includes a sensor 178. In some embodiments, the sensor 178 is part of the bottom hole assembly 170. The sensor 178 may be, for example, a set of position sensors that is part of the electronics for an RSS. Alternatively or in addition, the sensor 178 may be a temperature sensor, a pressure sensor, or other sensor for detecting a downhole condition during drilling. Alternatively still, the sensor may be an induction log or gamma ray log or other log that detects fluid and/or geology downhole.

The sensor 178 may be part of a MWD or a LWD assembly. It is observed that the sensor 178 is located above the mud motors 174. This is a common practice for MWD assemblies. This allows the electronic components of the sensor 178 to be spaced apart from the high vibration and centrifugal forces acting on the bit 172.

Where the sensor 178 is a set of position sensors, the sensors may include three inclinometer sensors and three environmental acceleration sensors. Ideally, a temperature sensor and a wear sensor will also be placed in the drill bit 172. These signals are input into a multiplexer and transmitted.

As the wellbore 150 is being formed, the operator may wish to evaluate the integrity of the cement sheath 112 placed around the surface casing 110 (or other casing string). To do this, the industry has relied upon so-called cement bond logs. As discussed above, a cement bond log (or CBL), uses an acoustic signal that is transmitted by a logging tool at the end of a wireline. The logging tool includes a transmitter, and one or more receivers that "listen" for sound waves generated by the transmitter through the surrounding casing string. The logging tool includes a signal processor that takes a continuous measurement of the amplitude of sound pulses from the transmitter to the receiver. Alternately, the attenuation of the sonic signal may be measured.

In some instances, a bond log will measure acoustic impedance of the material in the annulus directly behind the casing. This may be done through resonant frequency decay. Such logs include, for example, the USIT log of Schlumberger (of Sugar Land, Tex.) and the CAST-V log of Halliburton (of Houston, Tex.).

It is desirable to implement a downhole telemetry system that enables the operator to evaluate cement sheath integrity without need of running a CBL line. This enables the operator to check cement sheath integrity as soon as the cement has set in the annular region 115 or as soon as the wellbore 150 is completed. Additionally or alternatively, one or more sensors (not shown) may be deployed downhole to monitor a wide variety of properties, including, but not limited to, fluid characteristics, temperature, depth, etc., as those skilled in the art will plainly understand.

To do this, the well site 100 includes a plurality of battery-powered intermediate communications nodes 180. The battery-powered intermediate communications nodes 180 are placed along the outer surface 114 of the surface casing 110 according to a pre-designated spacing. The battery-powered intermediate communications nodes 180 are configured to receive and then relay acoustic signals along the length of the wellbore 150 in node-to-node arrangement up to the topside communications node 182. The topside communications node 182 is placed closest to the surface 101. The topside communications node 182 is configured to receive acoustic signals and convert them to electrical or optical signals. The topside communications node 182 may be above grade or below grade.

The well site 100 of FIG. 1 also shows a receiver 190. The receiver 190 comprises a processor 192 that receives signals sent from the topside communications node 182. The signals may be received through a wire (not shown) such as a co-axial cable, a fiber optic cable, a USB cable, or other electrical or optical communications wire. Alternatively, the receiver 190 may receive the final signals from the topside communications node 182 wirelessly through a modem, a transceiver or other wireless communications link such as Bluetooth or Wi-Fi. The receiver 190 preferably receives electrical signals via a so-called Class I, Division I conduit, that is, a housing for wiring that is considered acceptably safe in an explosive environment. In some applications, radio, infrared or microwave signals may be utilized.

The processor 192 may include discrete logic, any of various integrated circuit logic types, or a microprocessor. In any event, the processor 192 may be incorporated into a computer having a screen. The computer may have a separate keyboard 194, as is typical for a desk-top computer, or an integral keyboard as is typical for a laptop or a personal digital assistant. In one aspect, the processor 192 is part of a multi-purpose "smart phone" having specific "apps" and wireless connectivity.

As indicated, the intermediate communications nodes 180 of the downhole telemetry system are powered by batteries and, as such, system energy limitations can be encountered. While the useful life of the network can be extended by placing the nodes into a "deep sleep" mode when data collection and communication are not needed; heretofore, there have been no methods available to awaken the intermediate communications nodes 180 when data acquisition is required. Thus, prior to the systems and methods of the present disclosure, the downhole telemetry system was always in the active state; consequently, the life of the network was limited to months, not years.

FIG. 1 illustrates the use of a wireless data telemetry system during a drilling operation. As may be appreciated, the wireless downhole telemetry system may also be employed after a well is completed.

Figure 2:
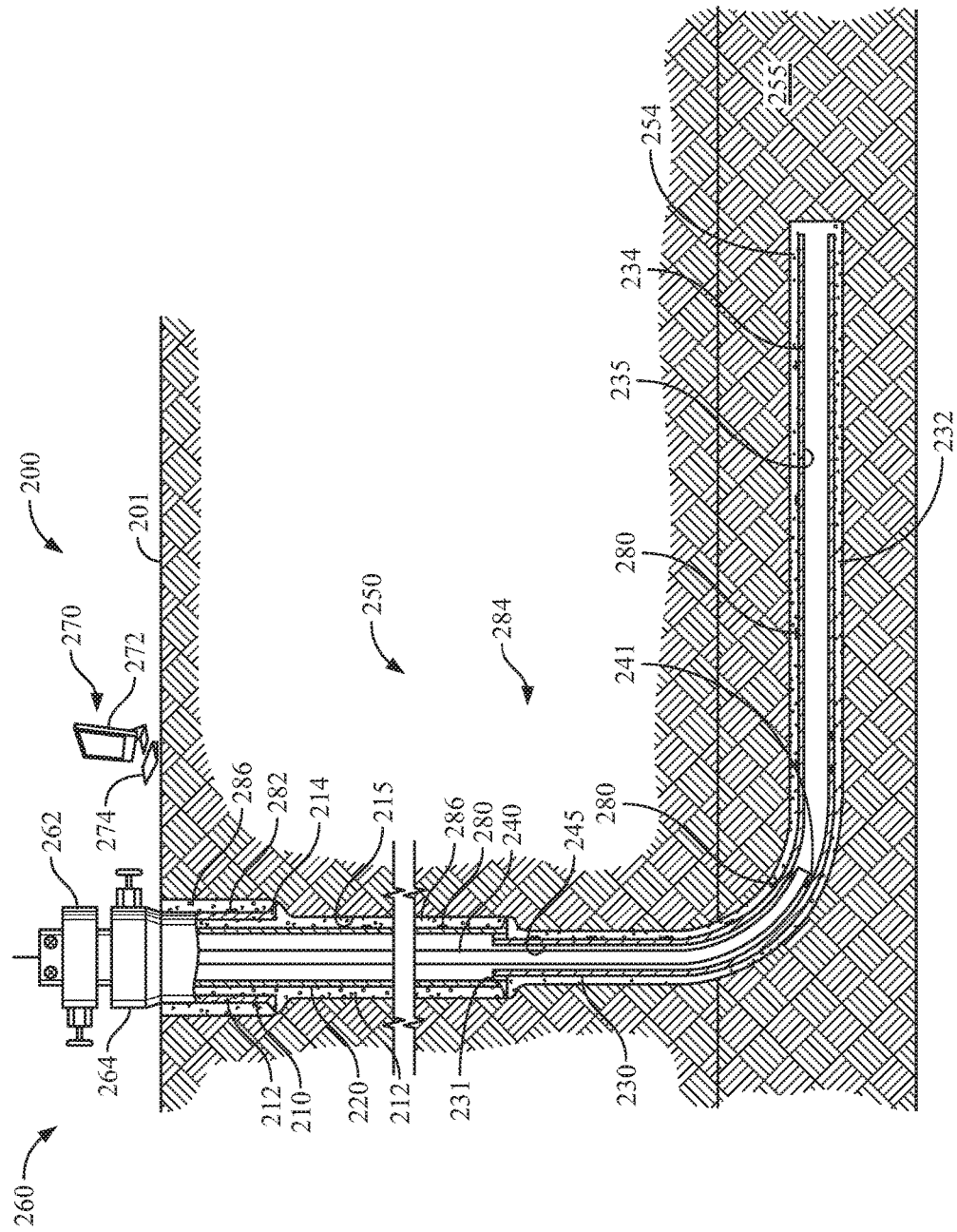
FIG. 2 presents a cross-sectional view of an illustrative, nonexclusive example of a wellbore having been completed. The illustrative wellbore has been completed as a cased hole completion. A series of communications nodes is placed along the casing string as part of a telemetry system, according to the present disclosure.

FIG. 2 is a cross-sectional view of an illustrative well site 200. The well site 200 includes a wellbore 250 that penetrates into a subsurface formation 255. The wellbore 250 has been completed as a cased-hole completion for producing hydrocarbon fluids. The well site 200 also includes a well head 260. The well head 260 is positioned at an earth surface 201 to control and direct the flow of formation fluids from the subsurface formation 255 to the surface 201.

Referring first to the well head 260, the well head 260 may be any arrangement of pipes or valves that receive reservoir fluids at the top of the well. In the arrangement of FIG. 2, the well head 260 represents a so-called Christmas tree. A Christmas tree is typically used when the subsurface formation 255 has enough in situ pressure to drive production fluids from the formation 255, up the wellbore 250, and to the surface 201. The illustrative well head 260 includes a top valve 262 and a bottom valve 264.

It is understood that rather than using a Christmas tree, the well head 260 may alternatively include a motor (or prime mover) at the surface 201 that drives a pump. The pump, in turn, reciprocates a set of sucker rods and a connected positive displacement pump (not shown) downhole. The pump may be, for example, a rocking beam unit or a hydraulic piston pumping unit. Alternatively still, the well head 260 may be configured to support a string of production tubing having a downhole electric submersible pump, a gas lift valve, or other means of artificial lift (not shown). The present inventions are not limited by the configuration of operating equipment at the surface unless expressly noted in the claims.

Referring next to the wellbore 250, the wellbore 250 has been completed with a series of pipe strings referred to as casing. First, a string of surface casing 210 has been cemented into the formation. Cement is shown in an annular bore 215 of the wellbore 250 around the casing 210. The cement is in the form of an annular sheath 212. The surface casing 110 has an upper end in sealed connection with the lower valve 264.

Next, at least one intermediate string of casing 220 is cemented into the wellbore 250. The intermediate string of casing 220 is in sealed fluid communication with the upper master valve 262. A cement sheath 212 is again shown in a bore 215 of the wellbore 250. The combination of the casing 210/220 and the cement sheath 212 in the bore 215 strengthens the wellbore 250 and facilitates the isolation of formations behind the casing 210/220.

It is understood that a wellbore 250 may, and typically will, include more than one string of intermediate casing. In some instances, an intermediate string of casing may be a liner.

Finally, a production string 230 is provided. The production string 230 is hung from the intermediate casing string 220 using a liner hanger 231. The production string 230 is a liner that is not tied back to the surface 101. In the arrangement of FIG. 2, a cement sheath 232 is provided around the liner 230.

The production liner 230 has a lower end 234 that extends to an end 254 of the wellbore 250. For this reason, the wellbore 250 is said to be completed as a cased-hole well. Those of ordinary skill in the art will understand that for production purposes, the liner 230 may be perforated after cementing to create fluid communication between a bore 235 of the liner 230 and the surrounding rock matrix making up the subsurface formation 255. In one aspect, the production string 230 is not a liner but is a casing string that extends back to the surface.

As an alternative, end 254 of the wellbore 250 may include joints of sand screen (not shown). The use of sand screens with gravel packs allows for greater fluid communication between the bore 235 of the liner 230 and the surrounding rock matrix while still providing support for the wellbore 250. In this instance, the wellbore 250 would include a slotted base pipe as part of the sand screen joints. Of course, the sand screen joints would not be cemented into place and would not include subsurface communications nodes.

The wellbore 250 optionally also includes a string of production tubing 240. The production tubing 240 extends from the well head 260 down to the subsurface formation 255. In the arrangement of FIG. 2, the production tubing 240 terminates proximate an upper end of the subsurface formation 255. A production packer 241 is provided at a lower end of the production tubing 240 to seal off an annular region 245 between the tubing 240 and the surrounding production liner 230. However, the production tubing 240 may extend closer to the end 234 of the liner 230.

In some completions a production tubing 240 is not employed. This may occur, for example, when a monobore is in place.

It is also noted that the bottom end 234 of the production string 230 is completed substantially horizontally within the subsurface formation 255. This is a common orientation for wells that are completed in so-called "tight" or "unconventional" formations. Horizontal completions not only dramatically increase exposure of the wellbore to the producing rock face, but also enables the operator to create fractures that are substantially transverse to the direction of the wellbore. Those of ordinary skill in the art may understand that a rock matrix will generally "part" in a direction that is perpendicular to the direction of least principal stress. For deeper wells, that direction is typically substantially vertical. However, the present inventions have equal utility in vertically completed wells or in multi-lateral deviated wells.

As with the well site 100 of FIG. 1, the well site 200 of FIG. 2 includes a telemetry system that utilizes a series of novel communications nodes. This again is for the purpose of evaluating the integrity of the cement sheath 212, 232. The communications nodes are placed along the outer diameter of the casing strings 210, 220, 230. These nodes allow for the high speed transmission of wireless signals based on the in situ generation of acoustic waves.

The nodes first include a topside communications node 282. The topside communications node 282 is placed closest to the surface 201. The topside node 282 is configured to receive acoustic signals.

In addition, the nodes include a plurality of subsurface battery-powered intermediate communications nodes 280. Each of the subsurface battery-powered intermediate communications nodes 280 is configured to receive and then relay acoustic signals along essentially the length of the wellbore 250. For example, the subsurface battery-powered intermediate communications nodes 280 can utilize two-way electro-acoustic transducers to receive and relay mechanical waves.

The subsurface battery-powered intermediate communications nodes 280 transmit signals as acoustic waves. The acoustic waves can be at a frequency of, for example, between about 50 kHz and 500 kHz. The signals are delivered up to the topside communications node 282 so that signals indicative of cement integrity are sent from node-to-node. A last subsurface battery-powered intermediate communications node 280 transmits the signals acoustically to the topside communications node 282. Communication may be between adjacent nodes or may skip nodes depending on node spacing or communication range. Preferably, communication is routed around nodes which are not functioning properly.

The well site 200 of FIG. 2 shows a receiver 270. The receiver 270 can comprise a processor 272 that receives signals sent from the topside communications node 282. The processor 272 may include discrete logic, any of various integrated circuit logic types, or a microprocessor. The receiver 270 may include a screen and a keyboard 274 (either as a keypad or as part of a touch screen). The receiver 270 may also be an embedded controller with neither a screen nor a keyboard which communicates with a remote computer such as via wireless, cellular modem, or telephone lines.

The signals may be received by the processor 272 through a wire (not shown) such as a co-axial cable, a fiber optic cable, a USB cable, or other electrical or optical communications wire. Alternatively, the receiver 270 may receive the final signals from the topside node 282 wirelessly through a modem or transceiver. The receiver 270 can receive electrical signals via a so-called Class I, Div. 1 conduit, that is, a wiring system or circuitry that is considered acceptably safe in an explosive environment.

FIGS. 1 and 2 present illustrative wellbores 150, 250 that may receive a downhole telemetry system using acoustic transducers. In each of FIGS. 1 and 2, the top of the drawing page is intended to be toward the surface and the bottom of the drawing page toward the well bottom. While wells commonly are completed in substantially vertical orientation, it is understood that wells may also be inclined and even horizontally completed. When the descriptive terms "up" and "down" or "upper" and "lower" or similar terms are used in reference to a drawing, they are intended to indicate location on the drawing page, and not necessarily orientation in the ground, as the present inventions have utility no matter how the wellbore is orientated.

In each of FIGS. 1 and 2, the battery-powered intermediate communications nodes 180, 280 are specially designed to withstand the same corrosive and environmental conditions (for example, high temperature, high pressure) of a wellbore 150 or 250, as the casing strings, drill string, or production tubing. To do so, it is preferred that the battery-powered intermediate communications nodes 180, 280 include sealed steel housings for holding the electronics. In one aspect, the steel material is a corrosion resistant alloy.

As with the embodiment of FIG. 1, the intermediate communications nodes 280 of the downhole telemetry system are powered by batteries and, as such, system energy limitations can be encountered. While the useful life of the network can be extended by placing the nodes into a "deep sleep" mode when data collection and communication are not needed; heretofore, there have been no methods available to awaken the intermediate communications nodes 280 when data acquisition is required. Thus, prior to the systems and methods of the present disclosure, the downhole telemetry system was always in the active state; consequently, the life of the network was limited to months, not years.

Figure 3:
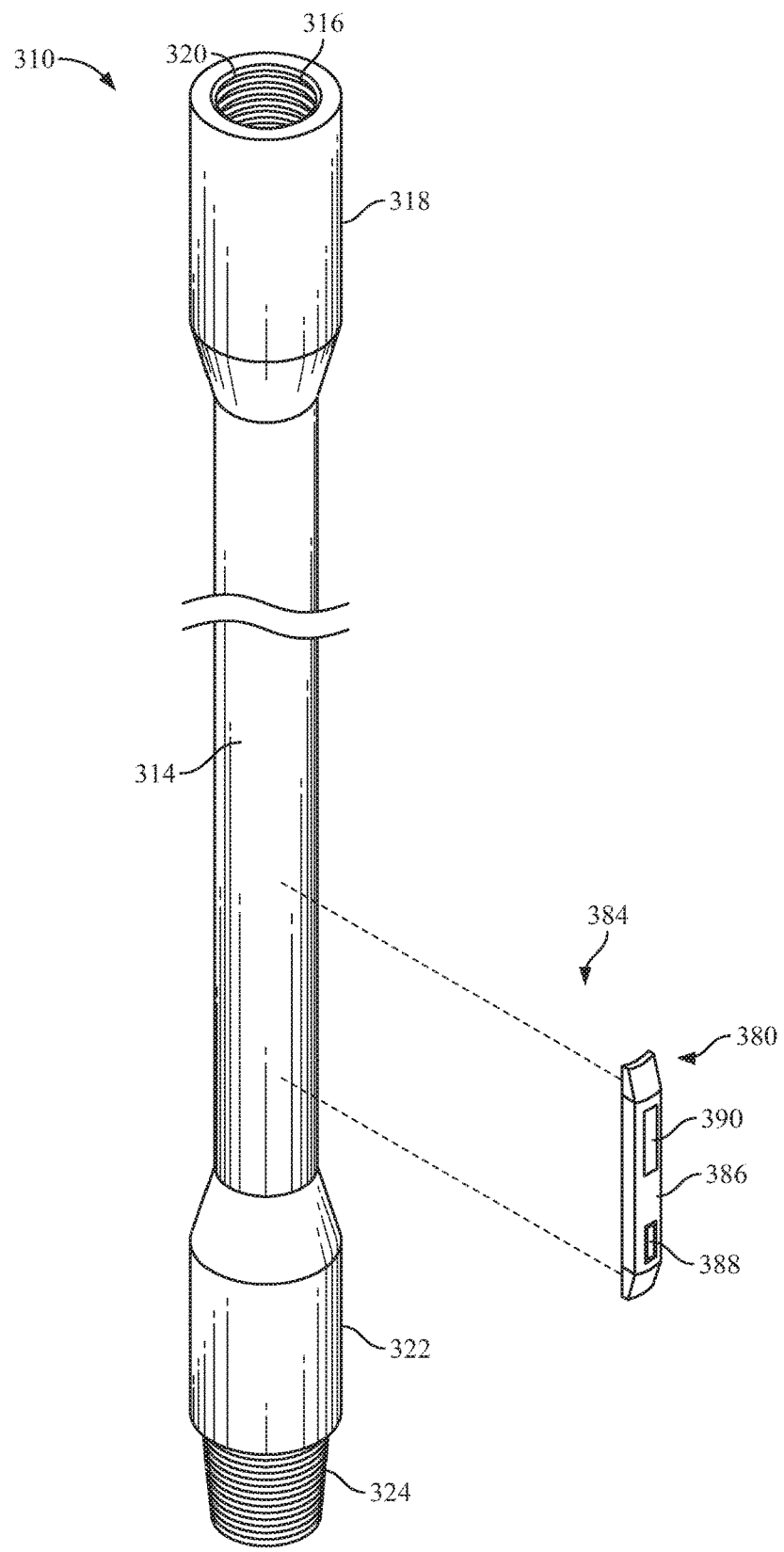
FIG. 3 presents a schematic view of an illustrative embodiment of a hybrid network including at least one surface or topside communications node, and a plurality of downhole intermediate communications nodes, according to the present disclosure.

Referring now to FIG. 3, an enlarged perspective view of an illustrative tubular section 310 of a tubular body, along with an illustrative intermediate communications node 380 is shown. The illustrative intermediate communications node 380 is shown exploded away from the tubular section 310. The tubular section 310 has an elongated wall 314 defining an internal bore 316. The tubular section 310 has a box end 318 having internal threads 320, and a pin end 322 having external threads 324.

As noted, the illustrative intermediate communications node 380 is shown exploded away from the tubular section 310. The intermediate communications node 380 is structured and arranged to attach to the wall 314 of the tubular section 310 at a selected location. In one aspect, selected tubular sections 310 will each have an intermediate communications node 380 between the box end 318 and the pin end 322. In one arrangement, the intermediate communications node 380 is placed immediately adjacent the box end 318 or, alternatively, immediately adjacent the pin end 322 of every tubular section 310. In another arrangement, the intermediate communications node 380 is placed at a selected location along every second or every third tubular section 310. In other aspects, more or less than one intermediate communications node 380 may be placed per tubular section 310.

In some embodiments, the intermediate communications node 380 shown in FIG. 3 is designed to be pre-welded onto the wall 314 of the tubular section 310. In some embodiments, intermediate communications node 380 is configured to be selectively attachable to/detachable from a intermediate by mechanical means at a well 100, 200 (see FIGS. 1-2). This may be done, for example, through the use of clamps (not shown). Alternatively, an epoxy or other suitable acoustic couplant may be used for chemical bonding. In any instance, the intermediate communications node 380 is an independent wireless communications device that is designed to be attached to an external surface of a tubular.

There are benefits to the use of an externally-placed communications node that uses acoustic waves. For example, such a node will not interfere with the flow of fluids within the internal bore 316 of the tubular section 310. Further, installation and mechanical attachment can be readily assessed or adjusted, as necessary.

As shown in FIG. 3, the intermediate communications node 380 includes a housing 386. The housing 386 supports a power source residing within the housing 386, which may be one or more batteries, as shown schematically at 390. The housing 386 also supports an electro-acoustic transducer, shown schematically at 388. In some embodiments, the electro-acoustic transducer 388 may be a two-way transceiver that can both receive and transmit acoustic signals. The intermediate communications node 380 is intended to represent the plurality of intermediate communications nodes 180 of FIG. 1, in one embodiment, and the plurality of intermediate communications nodes 280 of FIG. 2, in another embodiment. The two-way electro-acoustic transducer 388 in each intermediate communications node 380 allows acoustic signals to be sent from node-to-node, either up the wellbore or down the wellbore. Where the tubular section 310 is formed of carbon steel, such as a casing or liner, the housing 386 may be fabricated from carbon steel. This metallurgical match avoids galvanic corrosion at the coupling.

Figure 4:
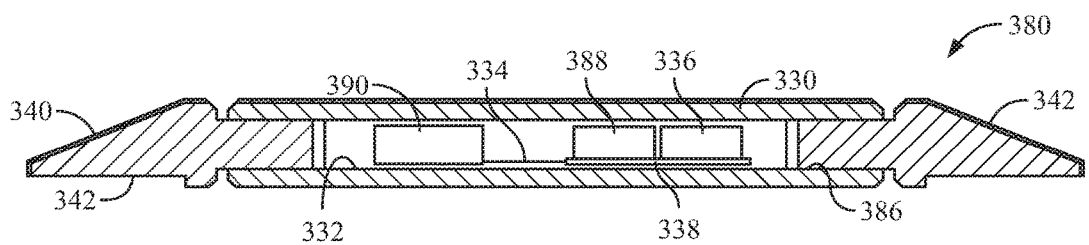
FIG. 4 is a schematic view of an illustrative embodiment of a sound or vibration generator, according to the present disclosure.

FIG. 4 provides a cross-sectional view of the intermediate communications node 380 of FIG. 3. The view is taken along the longitudinal axis of the intermediate communications node 380. The housing 386 is dimensioned to be strong enough to protect internal electronics. In one aspect, the housing 386 has an outer wall 330 that may be about 0.2 inches (0.51 cm) in thickness. A cavity 332 houses the electronics, including, by way of example and not of limitation, a battery 390, a power supply wire 334, a transceiver 336, and a circuit board 338. The circuit board 338 will preferably include a micro-processor or electronics module that processes acoustic signals. An electro-acoustic transducer 388 is provided to convert acoustical energy to electrical energy (or vice-versa) and is coupled with outer wall 330 on the side attached to the tubular body.

As may be appreciated by those skilled in the art, in some embodiments, the transceiver 336 of intermediate communications nodes 380 may be replaced by separate transmitters and receivers.

In some embodiments, the transceiver 336 of intermediate communications nodes 380 may also produce acoustic telemetry signals. In some embodiments, an electrical signal is delivered to an electromechanical transducer, such as through a driver circuit. In some embodiments, the acoustic waves represent asynchronous packets of information comprising a plurality of separate tones.

In some embodiments, the acoustic telemetry data transfer is accomplished using multiple frequency shift keying (MFSK). Any extraneous noise in the signal is moderated by using well-known analog and/or digital signal processing methods. This noise removal and signal enhancement may involve conveying the acoustic signal through a signal conditioning circuit using, for example, a bandpass filter.

In some embodiments, the transceiver 336 of intermediate communications nodes 380 is the same electro-acoustic transducer that originally received the MFSK data. The signal generated by the electro-acoustic transducer then passes through the housing 386 to the tubular body 310, and propagates along the tubular body 310 to other intermediate communications nodes 380. In one aspect, the acoustic signal is generated and received by a magnetostrictive transducer comprising a coil wrapped around a core as the transceiver. In another aspect, the acoustic signal is generated and received by a piezoelectric ceramic transducer. In either case, the electrically encoded data are transformed into a sonic wave that is carried through the wall 314 of the tubular body 310 in the wellbore.

In some embodiments, the intermediate communications nodes 380 may also be provided with a protective outer layer 340. The protective outer layer 340 resides external to the wall 330 and provides an additional thin layer of protection for the electronics. The intermediate communications nodes 380 may also be fluid sealed with the housing 386 to protect the internal electronics. Additional protection for the internal electronics is available using an optional potting material.

In some embodiments, the intermediate communications nodes 380 may also optionally include a shoe 342. More specifically, the intermediate communications nodes 380 may include a pair of shoes 342 disposed at opposing ends of the wall 330. Each of the shoes 342 provides a beveled face that helps prevent the node 380 from hanging up on an external tubular body or the surrounding earth formation, as the case may be, during run-in or pull-out. The shoes 342 may also have an optional cushioning material (not shown) under the outer layer 340.

As with the embodiments of FIG. 1-2, the intermediate communications nodes 380 of the downhole telemetry system are powered by batteries and, as such, system energy limitations can be encountered. While the useful life of the network can be extended by placing the nodes into a "deep sleep" mode when data collection and communication are not needed; heretofore, there have been no methods available to awaken the intermediate communications nodes 380 when data acquisition is required. Thus, prior to the systems and methods of the present disclosure, the downhole telemetry system was always in the active state; consequently, the life of the network was limited to months, not years.

Referring now to FIGS. 1-4, to address the issue of battery life, as well as other issues, disclosed herein is a hybrid electro-acoustic system 184, 284, 384 that extends the battery life of a downhole wireless telemetry system is provided. The hybrid electro-acoustic system 184, 284, 384, includes a plurality of battery-powered intermediate communications nodes 180, 280, 380, spaced along a downhole tubular body, which may be a casing 110, 210, or a tubular section 310, pipe or liner, and attached to a wall 114, 214, 314 of the tubular body 110, 210, 310. Each of the battery-powered intermediate communications nodes 180, 280, 380, are configured to alternate between a sleep mode and an active mode and include a power source that includes one or more batteries 390 positioned within a housing 186, 286, 386. An electro-acoustic transducer 388 and a transceiver, or a separate transmitter and receiver, are positioned within the housing 186, 286, 386.

A topside communications node 182, 282, is provided that includes a transmitter and a power supply, the topside communications node 182, 282, structured and arranged to send an acoustic signal to one or more of the battery-powered intermediate communications nodes 180, 280, 380, to place same in an active mode. In some embodiments, the power supply of the topside communications node 182, 282, is sufficient to enable communications directly with the intermediate communications node 180, 280, 380, most remote from the surface 101, 201, and greater than the battery power provided to each of the intermediate communications nodes 180, 280, 380.

To awaken one or more of battery-powered intermediate communications nodes 180, 280, 380, the topside communications node 182, 282, is structured and arranged to communicate with the plurality of battery-powered intermediate communications nodes 180, 280, 380, by generating a sound or a vibration that propagates downhole via a wall 114, 214, 314 of the tubular body 110, 210, 310 or via a fluid within the tubular body 110, 210, 310.

Figure 5:
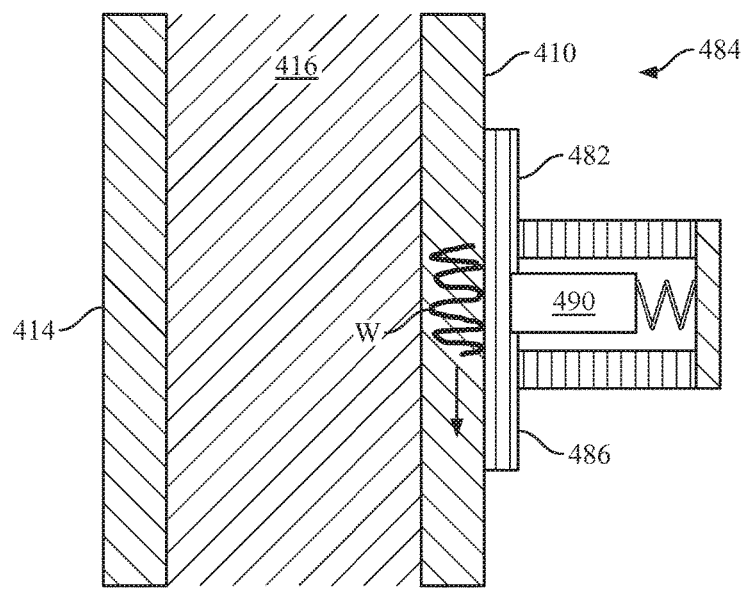
FIG. 5 is a schematic view of another illustrative embodiment of a sound or vibration generator, according to the present disclosure.

Referring now to FIG. 5, a schematic view of a topside portion of an embodiment of a hybrid electro-acoustic system 484 that extends the battery life of a downhole wireless telemetry system is provided. A tubular member 410 having an elongated wall 414, defining an internal bore 416, has a topside communications node 482 affixed thereto. The topside communications node 482 includes a housing 486. The housing 486 supports a power source residing within the housing 486. The housing 486 also supports an electro-acoustic transducer, which may be a two-way transceiver that can both receive and transmit acoustic signals. In some forms, the topside communications node 482 includes a device 490 selected from a repetitive impactor, a pneumatic vibrator, an eccentric motor, a piezoelectric stack, or the like, to generate a sound or vibration W that propagates downhole via the elongated wall 414 to communicate with the plurality of battery-powered intermediate communications nodes 180, 280, 380 (see FIGS. 1-4).

In some embodiments, the sound or vibration W from the topside communications node 482 is in the audible frequency range which contains at least one or more so-called "pass bands," defined as the low-attenuation frequency band from the topside communications node 482 to the last of the battery-powered intermediate communications nodes 180, 280, 380 (see FIGS. 1-4) of the downhole network.

Figure 6:
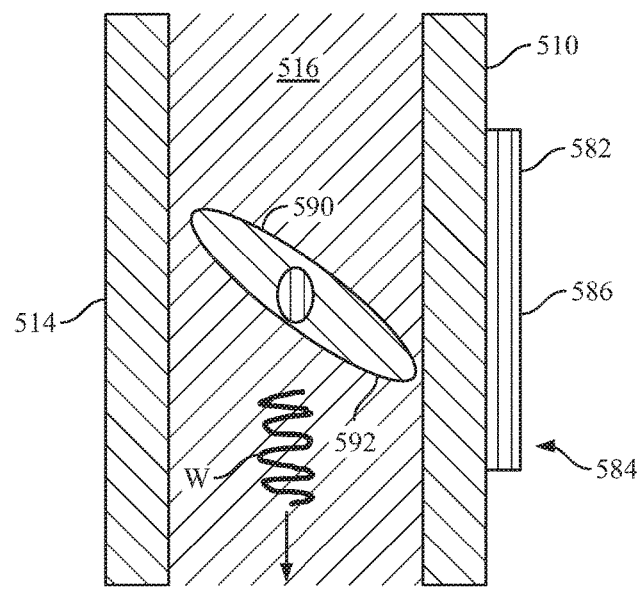
FIG. 6 is a schematic view of another illustrative embodiment of a sound or vibration generator, according to the present disclosure.

Referring now to FIG. 6, a schematic view of a topside portion of another embodiment of a hybrid electro-acoustic system 584 that extends the battery life of a downhole wireless telemetry system is presented. A tubular member 510 having an elongated wall 514, defining an internal bore 516, has a topside communications node 582 affixed thereto. The topside communications node 582 includes a housing 586. The housing 586 supports a power source residing within the housing 586. The housing 586 also supports an electro-acoustic transducer, which may be a two-way transceiver that can both receive and transmit acoustic signals. In some forms, the topside communications node 582 is operatively connected to a device 590, which may be an oscillating valve 592 to generate the sound or vibration W that propagates via the fluid within the internal bore 516 downhole to communicate with the plurality of battery-powered intermediate communications nodes 180, 280, 380 (see FIGS. 1-4).

In some embodiments, the sound or vibration W from the topside communications node 582 is in the audible frequency range which contains at least one or more so-called "pass bands," defined as the low-attenuation frequency band from the topside communications node 582 to the last of the battery-powered intermediate communications nodes 180, 280, 380 (see FIGS. 1-4) of the downhole network.

Figure 7:
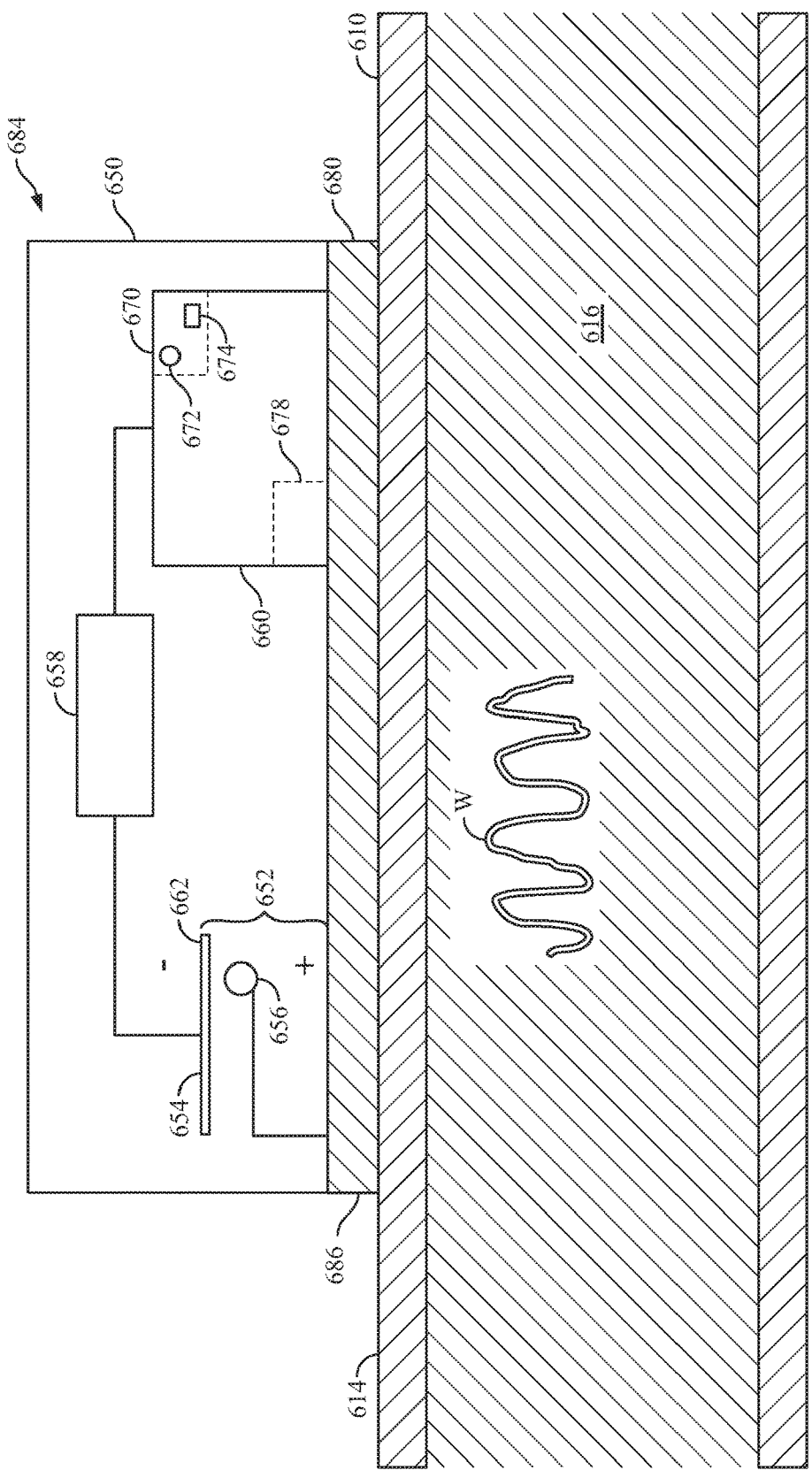
FIG. 7 is a schematic view of yet another illustrative embodiment of a sound or vibration generator, according to the present disclosure.

Referring now to FIG. 7, a schematic view of a downhole portion of an embodiment of a hybrid electro-acoustic system 684 that extends the battery life of a downhole wireless telemetry system is presented. A tubular member 610 having an elongated wall 614, defining an internal bore 616, has a plurality of battery-powered intermediate communications nodes 680 affixed thereto. The battery-powered intermediate communications node 680 includes a housing 686. The housing 686 also supports an electro-acoustic transducer (not shown), which may be a two-way transceiver that can both receive and transmit acoustic signals.

To receive the sound or vibration W from a topside communications node 182, 282, 482, 582 (see FIGS. 1, 2, 5, 6) directly, each of battery-powered intermediate communications nodes 680 is equipped with a device 650, which may be vibration resonator 652. Vibration resonator 652 includes an electrical switch 654 having a contact, such as a striker 656, as shown. Device 650 also includes a battery 658, in electrical communication with main circuit 660.

In operation, the sound or vibration W from a topside communications node 182, 282, 482, 582 travels down to the battery-powered intermediate communications node 682 and causes a resonant vibration of the vibration resonator 652 at a pre-selected frequency. The vibration of the vibration resonator 652 of the battery-powered intermediate communications node 682 switches on the power to the main circuit 660 of the battery-powered intermediate communications node 682, therefore; "waking up" the battery-powered intermediate communications node 682, making the battery-powered intermediate communications node 682 fully functional.

In some embodiments, the sound and vibration W from the topside communications node 182, 282, 482, 582 may be modulated, for example using a specific pattern of "on" and "off" signals to transmit the surface command to a specific battery-powered intermediate communications node 682. The resonator 652 may be a cantilever (as shown) or a ball-spring vibrator (not shown) with a resonance frequency matching that of the surface sound W from the topside communications node 182, 282, 482, 582. Once in vibration, the striker 656 of the vibration resonator 652 touches an electrode 662 of the switch 654 and closes the power circuit to wake-up the battery-powered intermediate communications node 682 from a sleep mode. To prevent a false alarm due to background noise or vibration, the switch 654 is designed so that a minimal number of cycles are required to wake-up the battery-powered intermediate communications node 682. Once all downhole nodes are awakened, the topside communications node 182, 282, 482, 582 could be used to issue a surface command to the battery-powered intermediate communications node 682.

In some embodiments, one or more of the battery-powered intermediate communications nodes 682 include energy harvesting electronics 670. In some embodiments, the vibration resonator 652 functions as a power receiver to convert sound and vibration energy W transmitted from the topside communications node 182, 282, 482, 582 into electrical power via the energy harvesting electronics 670. In some embodiments, the energy harvesting electronics 670 include a super-capacitor 672 and/or chargeable batteries 674.

In some embodiments, the plurality of battery-powered intermediate communications nodes 682 further comprise pass-band filtering circuitry 678 to isolate a pre-selected frequency range of the acoustic signal W.

Figure 8:
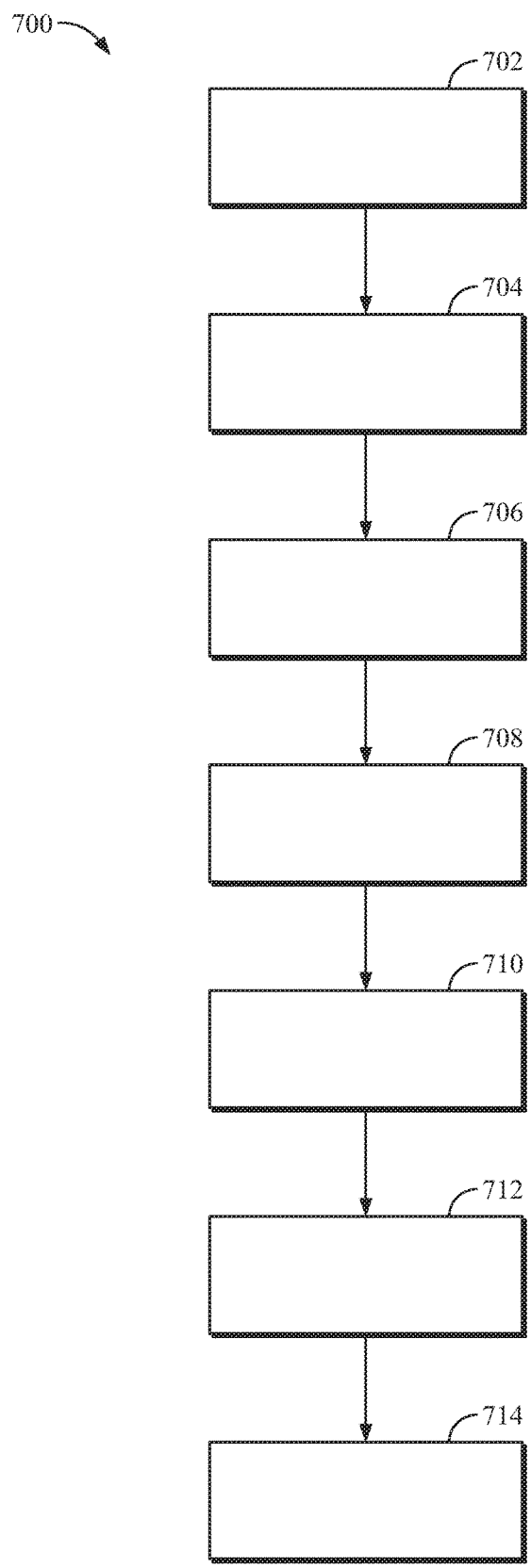
FIG. 8 is a flowchart of an exemplary method of extending battery life of a downhole wireless telemetry system, in accordance with an embodiment of the disclosure.

Referring now to FIG. 8, a method of extending battery life of a downhole wireless telemetry system 700 is presented. The method 700 includes the steps of 702, providing a plurality of battery-powered intermediate communications nodes spaced along a downhole tubular body and attached to a wall of the tubular body, each of the battery-powered intermediate communications nodes configured to alternate between a sleep mode and an active mode and including a power source comprising one or more batteries positioned within a housing; an electro-acoustic transducer and a transceiver, or a separate transmitter and receiver, positioned within the housing; 704, providing a topside communications node comprising: a transmitter and a power supply; 706, sending an acoustic signal from the topside communications node to one or more of the battery-powered intermediate communications nodes; and 708, placing one or more of the battery-powered intermediate communications nodes in the active mode.

In some embodiments, the method 700 includes 710, communicating with the plurality of battery-powered intermediate communications nodes by generating a sound or a vibration that propagates downhole via a wall of the tubular body or a fluid within the tubular body.

In some embodiments, the method 700 includes 712, initiating a resonant vibration in response to the sound or vibration from the topside communications node at a preselected frequency and placing one or more of the battery-powered intermediate communications nodes in the active mode by completing an electrical circuit.

In some embodiments, the method 700 includes 714, converting sound and vibration energy from the topside communications node into electrical power via energy harvesting electronics.

In some embodiments, the sleep mode is a deep-sleep mode.

In some embodiments, the power supply of the topside communications node is sufficient to enable communications directly with the intermediate communications node most remote from the surface and greater than the battery power provided to each of the intermediate communications nodes.

In some embodiments, the topside communications node further comprises a repetitive impactor, a pneumatic vibrator, an eccentric motor, a piezoelectric stack, or an oscillating valve to generate the sound or vibration that propagates downhole to communicate with the plurality of battery-powered intermediate communications nodes.

In some embodiments, the plurality of battery-powered intermediate communications nodes includes a vibration resonator.

An additional benefit of the hybrid system and methods disclosed herein is to provide a sensing mechanism to probe the condition along the well length. When the topside communications node sends a sound or vibration to the battery-powered intermediate communications nodes, the acoustic response of the battery-powered intermediate communications nodes reflect the condition of the propagation path between the surface and the downhole nodes. Therefore, a linear acoustic tomography may be constructed by pairing the topside communications node and each receiving battery-powered intermediate communications nodes, and acoustic parameters (sound speed and attenuation) between the pair can be measured simultaneously. With multiple pairs, the acoustic parameters between any two adjacent battery-powered intermediate communications nodes can be estimated mathematically using an inversion scheme. In principle, this process is similar to seismic inversion. When this type of measurement and analysis is done at different times, the information on the change in acoustic parameters may be extracted to infer the physical change of the well conditions, which may include change in fluid inside the pipe, cement condition change over time, or well-casing integrity, in general.

Figure 9:
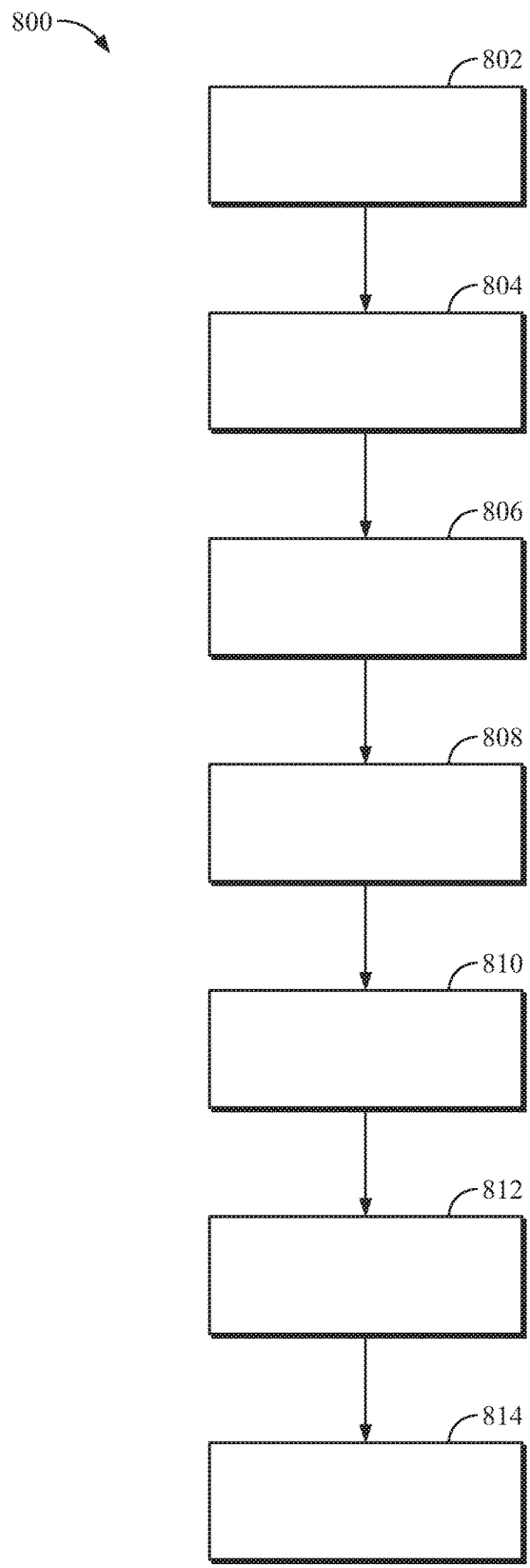
FIG. 9 is a flowchart of an exemplary a method of assessing changes in subterranean well integrity, in accordance with an embodiment of the disclosure.

In view thereof, referring now to FIG. 9, a method of assessing changes in subterranean well integrity along the length of the subterranean well 800, is provided. The method includes, 802, providing a plurality of battery-powered intermediate communications nodes spaced along a downhole tubular body and attached to a wall of the tubular body, each of the battery-powered intermediate communications nodes configured to alternate between a sleep mode and an active mode and including a power source comprising one or more batteries positioned within a housing; an electro-acoustic transducer and a transceiver, or a separate transmitter and receiver, positioned within the housing; 804, providing a topside communications node comprising: a transmitter and a power supply; 806 sending an acoustic signal from the topside communications node to one or more of the battery-powered intermediate communications nodes; and 808, determining the acoustic response of the one or more battery-powered intermediate communications nodes to assess the condition of a propagation path between the topside communications node and each of the one or more battery-powered intermediate communications nodes.

In some embodiments, the method 800 includes 810, constructing a linear acoustic tomography by measuring acoustic parameters between the topside communications node and each of the one or more battery-powered intermediate communications nodes.

In some embodiments, the method 800 includes 812, repeating step 810 at a different time, and 814, measuring the change in acoustic parameters to determine whether a physical change in well conditions has occurred.

In some embodiments, the physical change in well conditions includes a change in fluid in the tubular body, a change in cement condition over time, or a change in tubular body integrity over time.

EXAMPLE

Figure 10:
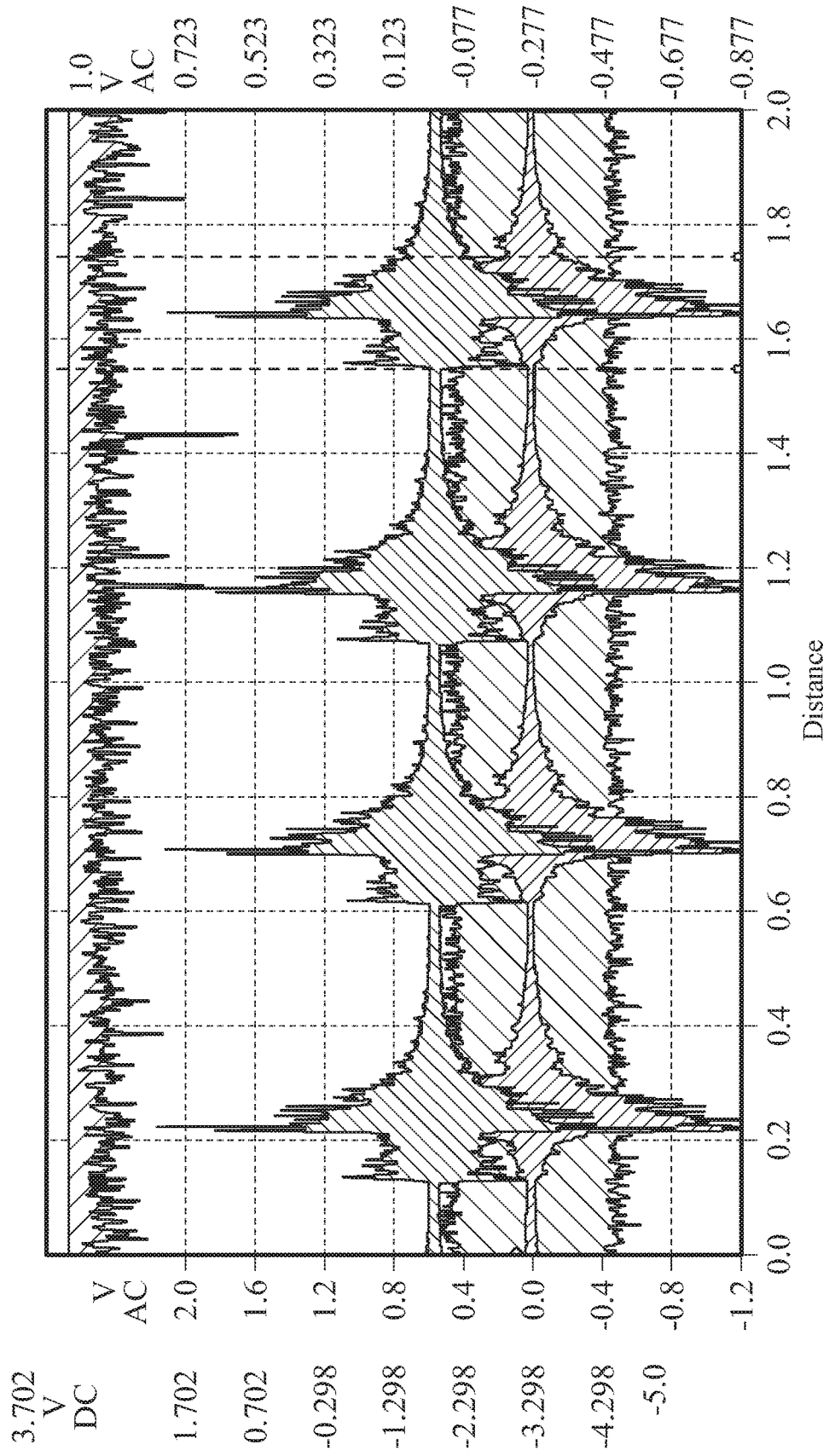
FIG. 10 is a graphical representation demonstrating that a repetitive impact sound wave may be transmitted over long distances, in accordance with an embodiment of the disclosure.

A hybrid electro-acoustic system for extending battery life of a downhole wireless telemetry system is provided. At a research test facility, step 702-706 of the method of FIG. 8 are conducted. As part of the method, the topside communications node transmits a repetitive impact sound along a casing having a distance of 1000 feet. As shown in FIG. 10, it is demonstrated that an audible vibration may be transmitted over a long distance, and that there are certain frequencies that transmit over a casing pipe more efficiently (a pass band).

Further illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

INDUSTRIAL APPLICABILITY

The apparatus and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A hybrid electro-acoustic system for extending battery life of a downhole wireless telemetry system, comprising:
 a plurality of subsurface battery-powered intermediate communications nodes spaced along a downhole tubular body and attached to a wall of the tubular body, each of the subsurface battery-powered intermediate communications nodes configured to alternate between a sleep mode and an active mode when the subsurface battery-powered intermediate communications nodes are in a wellbore and comprising
  a power source comprising one or more batteries positioned within a housing, the power source configured to provide sufficient power to transmit and receive signals to and from adjacent subsurface battery-powered intermediate communications nodes in the active mode,
  an electro-acoustic transducer, and a transceiver, or a separate transmitter and receiver, positioned within the housing and configured to transmit and receive signals at a frequency between 50 kHz and 500 kHz, and
  a vibration resonator tuned to initiate a resonant vibration in the presence of a sound or vibration at a pre-selected frequency in an audible frequency range;
 and
 a topside communications node comprising
  a power supply,
  a vibration-generating device structured and arranged to send a sound or vibration in the audible frequency range directly to any of the plurality of subsurface battery-powered intermediate communications nodes when the plurality of subsurface battery-operated intermediate communications nodes are in the wellbore, and
  an electro-acoustic transducer, and a transceiver, or a separate transmitter and receiver, configured to transmit and receive signals at a frequency between 50 kHz and 500 kHz;
 wherein the power supply of the topside communications node
  provides sufficient power to enable the sound or vibration in the audible frequency range generated by the vibration-generating device to cause a resonant vibration of the vibration resonators of any of the subsurface battery-powered intermediate communications nodes when said nodes are in the wellbore, thereby placing at least a subset of the subsurface battery-powered intermediate communications nodes in the active mode, and
  provides greater power than the power provided by the power source of each of the subsurface battery-powered intermediate communications nodes.

2. The system of claim 1, further comprising one or more battery-powered sensing nodes located at sensing locations along a downhole tubular body and attached on a wall of the tubular body, at least one sensing device in the sensing node, each of the battery-powered sensing nodes configured to alternate between a sleep mode and an active mode and comprising: a power source comprising one or more batteries positioned within a housing; an electro-acoustic transducer and a transceiver, or a separate transmitter and receiver, positioned within the housing, wherein the power supply of the topside communications node provides sufficient power to enable communications directly with the sensing node most remote from the surface and greater than the battery power provided to each of the sensing nodes.

3. The system of claim 1, wherein the sleep mode is a deep-sleep mode.

4. The system of claim 1, wherein the topside communications node communicates directly with each of the plurality of battery-powered intermediate communications nodes by generating a sound or a vibration that propagates downhole via a wall of the tubular body or a fluid within the tubular body.

5. The system of claim 1, wherein the vibration-generating device comprises a repetitive impactor, a pneumatic vibrator, an eccentric motor, a piezoelectric stack, or an oscillating valve, to generate the sound or vibration that propagates downhole to communicate with the plurality of battery-powered intermediate communications nodes.

6. The system of claim 5, wherein each of the plurality of subsurface battery-powered intermediate communications nodes further comprises an electrical switch that places said subsurface battery-powered intermediate communications nodes in the active mode when the sound or vibration is received directly from the topside communications node and the resonant vibration of the vibration resonator at the pre-selected frequency is initiated.

7. The system of claim 1, wherein the vibration resonator comprises a cantilever vibrator or a ball-spring vibrator, with a resonance frequency matching that of the pre-selected frequency.

8. The system of claim 1, wherein the pre-selected frequency is within a pass-band of the downhole tubular body, the pass-band being a frequency band in the audible frequency range where acoustic wave propagation loss in the downhole tubular body is minimal.

9. The system of claim 1, wherein the topside communications node further comprises a modulator for modulating the sound or vibration generated therefrom.

10. The system of claim 9, wherein the modulator produces a pattern of "on" and "off" signals to transmit a surface command directly to a specific subsurface battery-powered intermediate communications node.

11. The system of claim 1, wherein each of the plurality of subsurface battery-powered intermediate communications nodes further comprises energy harvesting electronics connected to the vibration resonator.

12. The system of claim 11, wherein the vibration resonator functions as a power receiver to convert energy of the sound or vibration transmitted from the topside communications node into electrical power via the energy harvesting electronics.

13. The system of claim 12, wherein the energy harvesting electronics comprises a super-capacitor or chargeable batteries.

14. The system of claim 1, wherein each of the plurality of subsurface battery-powered intermediate communications nodes further comprises pass-band filtering circuitry to isolate a pre-selected frequency range of the acoustic signal.

15. A method of extending battery life of a downhole wireless telemetry system, comprising:
providing a plurality of subsurface battery-powered intermediate communications nodes spaced along a downhole tubular body and attached to a wall of the tubular body, each of the subsurface battery-powered intermediate communications nodes configured to alternate between a sleep mode and an active mode when the subsurface battery-powered intermediate communications nodes are in a wellbore and comprising
a power source comprising one or more batteries positioned within a housing, the power source configured to provide sufficient power to transmit and receive signals to and from adjacent subsurface battery-powered intermediate communications nodes in the active mode,
an electro-acoustic transducer, and a transceiver, or a separate transmitter and receiver, positioned within the housing and configured to transmit and receive signals at a frequency between 50 kHz and 500 kHz, and
a vibration resonator tuned to initiate a resonant vibration in the presence of a sound or vibration at a pre-selected frequency in an audible frequency range;
providing a topside communications node comprising a power supply, a vibration generating device, and an electro-acoustic transducer;
using the vibration generating device, sending a sound or vibration in the audible frequency range directly to any of the plurality of subsurface battery-powered intermediate communications nodes when the plurality of subsurface battery-powered intermediate communications nodes are in the wellbore; and
placing one or more of the subsurface battery-powered intermediate communications nodes in the active mode in response to receiving the sound or vibration by the vibration resonator or resonators associated therewith when said nodes are in the wellbore, and initiating the resonant vibration in said vibration resonator or resonators.

16. The method of claim 15, wherein the sleep mode is a deep-sleep mode.

17. The method of claim 15, wherein the power supply of the topside communications node
provides sufficient power to enable the sound or vibration in the audible frequency range generated by the vibration-generating device to cause the resonant vibration of the vibration resonator or resonators, and
provides greater power than the power provided by the power source of each of the intermediate communications nodes.

18. The method of claim 15, wherein sending the sound or vibration in the audible frequency range directly to any of the plurality of subsurface battery-powered intermediate communications nodes further comprises propagating the sound or vibration via a wall of the tubular body or a fluid within the tubular body.

19. The method of claim 15, wherein the vibration-generating device further comprises a repetitive impactor, a pneumatic vibrator, an eccentric motor, a piezoelectric stack, or an oscillating valve,
to generate the sound or vibration that propagates downhole to communicate with the plurality of battery-powered intermediate communications nodes.

20. The method of claim 15, wherein the vibration resonator comprises a cantilever vibrator or a ball-spring vibrator, with a resonance frequency matching that of the pre-selected frequency.

21. The method of claim 15, further comprising placing one or more of the subsurface battery-powered intermediate communications nodes in the active mode by completing an electrical circuit when the vibration resonator initiates the resonant vibration.

22. The method of claim 15, further comprising converting energy of the sound or vibration transmitted from the topside communications node into electrical power via energy harvesting electronics connected to the vibration resonator.

23. A method of assessing changes in subterranean well integrity along the length of the subterranean well, comprising:
providing a plurality of subsurface battery-powered intermediate communications nodes spaced along a downhole tubular body and attached to a wall of the downhole tubular body, each of the subsurface battery-powered intermediate communications nodes configured to alternate between a sleep mode and an active mode and comprising
- a power source comprising one or more batteries positioned within a housing, the power source configured to provide sufficient power to transmit and receive signals to and from adjacent subsurface battery-powered intermediate communications nodes in the active mode,
- an electro-acoustic transducer, and a transceiver, or a separate transmitter and receiver, positioned within the housing and configured to transmit and receive signals at a frequency between 50 kHz and 500 kHz, and
- a vibration resonator tuned to initiate a resonant vibration in the presence of a sound or vibration at a pre-selected frequency in an audible frequency range;

providing a topside communications node comprising a power supply, a vibration generating device, and an electro-acoustic transducer;

using the vibration generating device, sending a sound or vibration in the audible frequency range directly to each of the plurality of subsurface battery-powered intermediate communications nodes when the plurality of subsurface battery-powered intermediate communications nodes are in the wellbore; and using the sound or vibration received by the vibration resonator when the plurality of subsurface battery-powered intermediate communications nodes are in the wellbore, determining an acoustic response of each of the plurality of one or more subsurface battery-powered intermediate communications nodes; and using said acoustic response, assessing a condition of a propagation path between the topside communications node and each of the plurality of subsurface battery-powered intermediate communications nodes.

24. The method of claim 23, further comprising constructing a linear acoustic tomography by measuring acoustic parameters between the topside communications node and each of the plurality of subsurface battery-powered intermediate communications nodes.

25. The method of claim 24, further comprising repeating the method at a different time with respect to a previous time and measuring a change in acoustic parameters between the different time and the previous time to determine whether a physical change in a well condition has occurred.

26. The method of claim 25, wherein the physical change in well conditions includes a change in fluid in the tubular body, a change in cement condition over time, or a change in tubular body integrity over time.

* * * * *